(12) United States Patent
Braedt et al.

(10) Patent No.: US 11,577,804 B2
(45) Date of Patent: Feb. 14, 2023

(54) DAMPER ASSEMBLY FOR BICYCLE GEARSHIFT MECHANISM

(71) Applicant: SRAM DEUTSCHLAND GmbH, Schweinfurt (DE)

(72) Inventors: Henrik Braedt, Hambach (DE); Tobias Harcke, Hambach (DE)

(73) Assignee: SRAM Deutschland GmbH, Schweinfurt (DE)

( * ) Notice: Subject to any disclaimer, the term of this patent is extended or adjusted under 35 U.S.C. 154(b) by 225 days.

(21) Appl. No.: 16/987,866

(22) Filed: Aug. 7, 2020

(65) Prior Publication Data
US 2021/0039748 A1 Feb. 11, 2021

(30) Foreign Application Priority Data

Aug. 8, 2019 (DE) ...................... 10 2019 005 579.9
Jul. 24, 2020 (DE) ...................... 10 2020 209 370.9

(51) Int. Cl.
*B62M 9/126* (2010.01)
*B62M 9/1248* (2010.01)
(Continued)

(52) U.S. Cl.
CPC ............ *B62M 9/126* (2013.01); *B62M 9/121* (2013.01); *B62M 9/1248* (2013.01); *B62M 9/124* (2013.01); *B62M 2009/12406* (2013.01)

(58) Field of Classification Search
CPC .......... F16H 9/121; F16H 9/124; F16H 9/125; F16H 9/126; F16H 9/1242; F16H 9/1244;
(Continued)

(56) References Cited

U.S. PATENT DOCUMENTS 6,394,921 B1 * 5/2002 Fukuda .................. B62M 9/126
474/82
8,852,041 B2 10/2014 Yamaguchi et al.
(Continued)

FOREIGN PATENT DOCUMENTS

DE 102011114699 4/2012
DE 102013001952 8/2013
(Continued)

OTHER PUBLICATIONS

Wikipedia, "Q-Faktor (Fahrrad)", Aug. 7, 2020, 4 pages, de.wikipedia.org/wiki/Q-Faktor_%28Fahrrad%29.

*Primary Examiner* — Michael R Mansen
*Assistant Examiner* — Raveen J Dias

(57) ABSTRACT

A bicycle derailleur includes a base element, a movable element having a receptacle and movably coupled to the base element, a rotary shaft mounted in the movable element in the receptacle to be rotatable about an axis of rotation, and a chain guide assembly rotatable relative to the movable element about the axis of rotation and which is coupled rotationally conjointly to the rotary shaft. An elastic force store device exerts on the chain guide assembly a preload force which preloads said chain guide assembly in a direction of rotation relative to the movable element. A damping device acts directly or indirectly between the movable element and the chain guide assembly and has a coupling device arranged radially within the first elastic force store device by which the damping device is coupled to a support, which is static in relation to the movable element, and the rotary shaft.

22 Claims, 15 Drawing Sheets

(51) Int. Cl.
*B62M 9/121* (2010.01)
*B62M 9/124* (2010.01)

(58) Field of Classification Search
CPC ......... F16H 9/1248; F16H 2009/12406; F16H 2009/12413; B62M 9/121; B62M 9/124; B62M 9/125; B62M 9/126; B62M 9/1242; B62M 9/1244; B62M 9/1248; B62M 2009/12406; B62M 2009/12413
See application file for complete search history.

(56) References Cited

U.S. PATENT DOCUMENTS

| | | | |
|---|---|---|---|
| 9,228,643 B2 * | 1/2016 | Yamaguchi | B62M 9/16 |
| 9,463,846 B1 | 10/2016 | Chang | |
| 9,475,547 B2 * | 10/2016 | Jordan | B62M 9/1248 |
| 9,751,590 B2 * | 9/2017 | Shipman | B62M 9/16 |
| 10,005,519 B2 * | 6/2018 | Calendrille, Jr. | B62M 9/124 |
| 10,086,904 B2 * | 10/2018 | Lin | B62M 9/124 |
| 10,189,542 B2 * | 1/2019 | Wu | B62M 9/16 |
| 10,435,110 B2 * | 10/2019 | Calendrille | B62M 9/127 |
| 10,577,053 B2 * | 3/2020 | Brown | B62M 9/126 |
| 10,759,494 B2 * | 9/2020 | Shipman | B62M 9/128 |
| 10,882,587 B2 * | 1/2021 | Chang | B62M 9/126 |
| 11,001,339 B2 * | 5/2021 | Liao | B62M 9/124 |
| 11,098,787 B2 * | 8/2021 | Ziegler | F16F 15/1292 |
| 11,124,270 B2 * | 9/2021 | Calendrille, Jr. | B62M 9/1248 |
| 11,148,754 B2 * | 10/2021 | Qin | B62M 9/1248 |
| 11,199,240 B2 * | 12/2021 | Brown | B62M 9/128 |
| 2007/0173360 A1 * | 7/2007 | Shahana | B62M 9/1242 474/82 |
| 2008/0026890 A1 * | 1/2008 | Oseto | B62M 9/1242 474/82 |
| 2008/0026891 A1 * | 1/2008 | Oseto | B62M 9/1242 474/82 |
| 2009/0137354 A1 * | 5/2009 | Oseto | B62M 9/126 474/82 |
| 2011/0224035 A1 * | 9/2011 | Wehage | B62M 9/1242 474/80 |
| 2013/0090196 A1 * | 4/2013 | Yamaguchi | B62M 9/1244 474/80 |
| 2013/0203532 A1 | 8/2013 | Jordan | |
| 2014/0371013 A1 | 12/2014 | Yamaguchi | |
| 2015/0072817 A1 * | 3/2015 | Yamaguchi | B62M 9/126 474/113 |
| 2016/0046352 A1 * | 2/2016 | Shipman | B62M 9/1248 29/428 |
| 2016/0176478 A1 * | 6/2016 | Chang | B62M 9/126 474/69 |
| 2016/0375959 A1 * | 12/2016 | Calendrille, Jr. | B62M 9/124 474/122 |
| 2017/0113760 A1 * | 4/2017 | Lin | B62M 9/1248 |
| 2017/0174289 A1 * | 6/2017 | Wu | B62M 9/1242 |
| 2017/0283004 A1 * | 10/2017 | Calendrille | B62M 9/121 |
| 2017/0327183 A1 * | 11/2017 | Shipman | B62M 9/1248 |
| 2018/0148129 A1 * | 5/2018 | Bernardele | B62M 9/126 |
| 2018/0273139 A1 * | 9/2018 | Shipman | B62M 9/126 |
| 2018/0274623 A1 * | 9/2018 | Brown | B62M 9/126 |
| 2018/0370598 A1 * | 12/2018 | Chang | B62M 9/16 |
| 2019/0063547 A1 * | 2/2019 | Ziegler | B62M 9/124 |
| 2019/0329842 A1 * | 10/2019 | Calendrille, Jr. | B62M 9/126 |
| 2020/0062344 A1 * | 2/2020 | Liao | B62M 9/1242 |
| 2020/0130779 A1 * | 4/2020 | Ma | B62M 9/125 |
| 2020/0369343 A1 * | 11/2020 | Chiang | B62M 9/126 |
| 2021/0070396 A1 * | 3/2021 | Garcia | B62M 9/125 |
| 2021/0078673 A1 * | 3/2021 | Chang | B62M 9/126 |
| 2021/0324934 A1 * | 10/2021 | Brown | B62M 9/122 |
| 2021/0362805 A1 * | 11/2021 | Ziegler | B62M 9/16 |

FOREIGN PATENT DOCUMENTS

| | | | | |
|---|---|---|---|---|
| DE | 102014225036 | | 6/2015 | |
| EP | 0163583 | A1 * | 12/1985 | ............ B62M 9/126 |
| EP | 0031215 | | 7/1987 | |
| EP | 2891601 | | 7/2015 | |

* cited by examiner

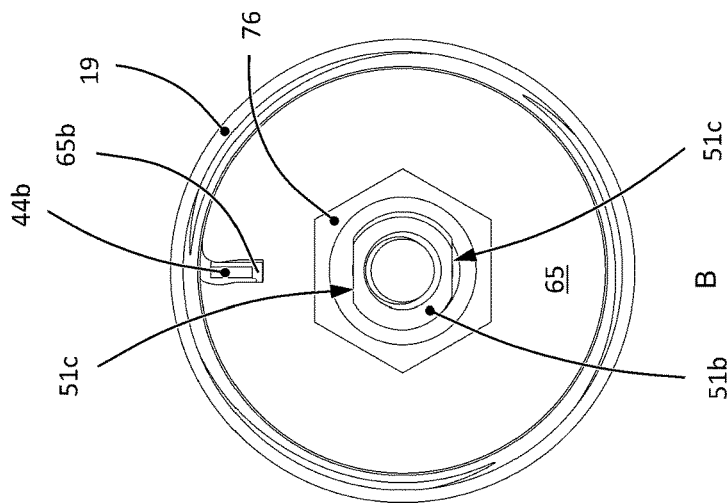
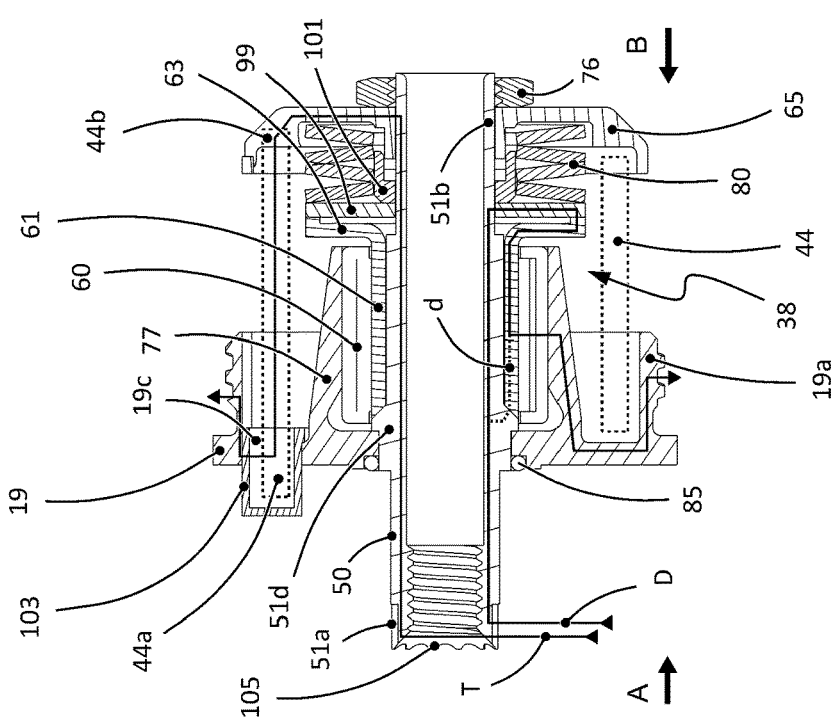
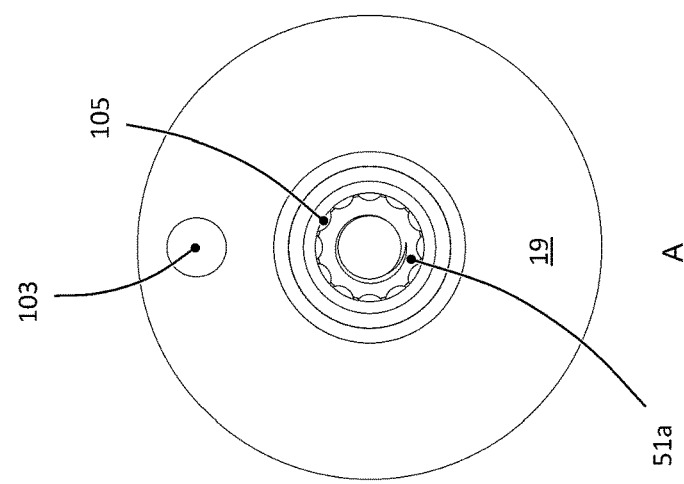

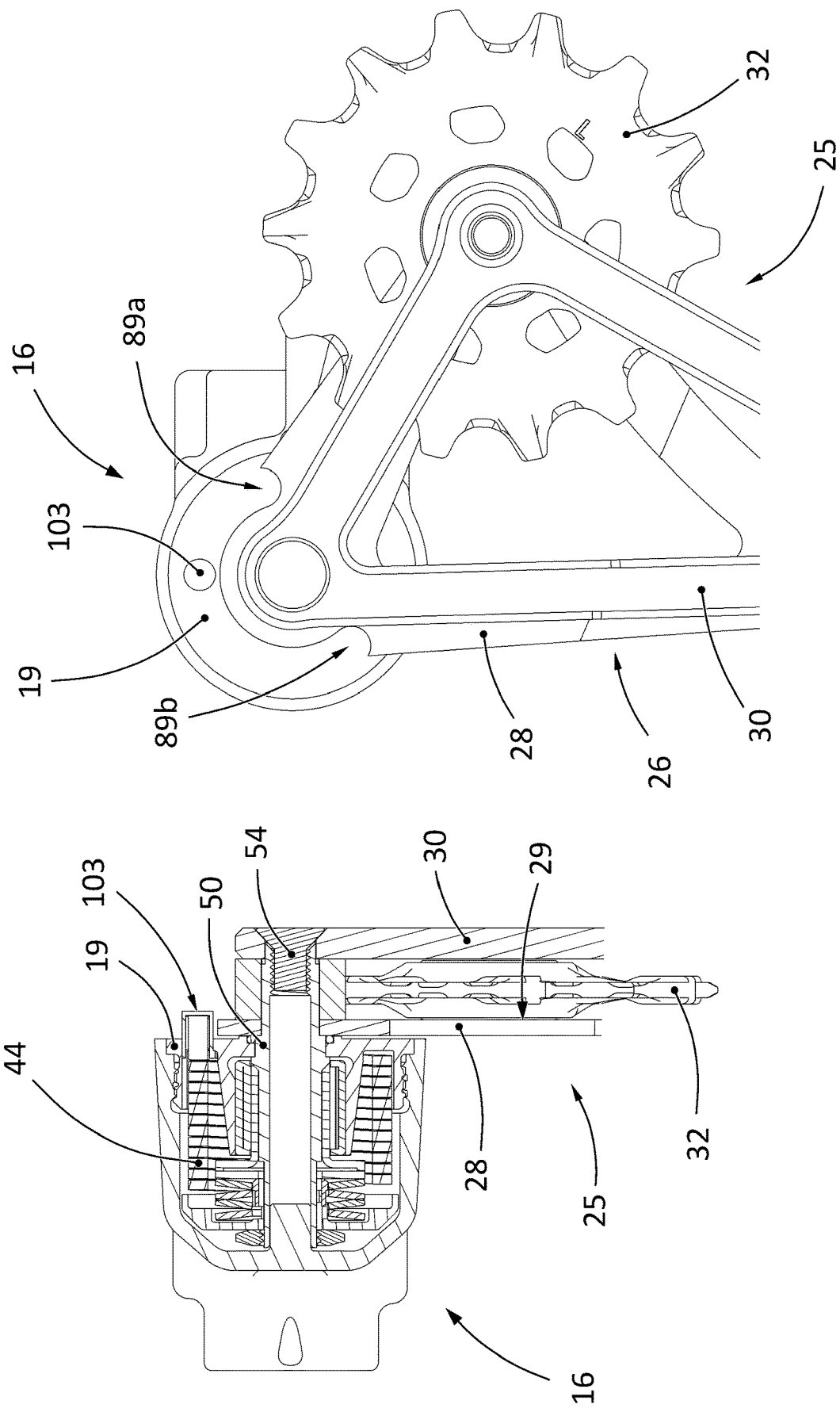

DAMPER ASSEMBLY FOR BICYCLE GEARSHIFT MECHANISM

PRIORITY

This application claims priority to, and/or the benefit of, German patent application DE 10 2019 005 579.9, filed on Aug. 8, 2019 and DE 10 2020 209 370.9, filed on Jul. 24, 2019, the contents of both DE 10 2019 005 579.9 and DE 10 2020 209 370.9 are included by reference herein in their entirety.

BACKGROUND

A bicycle can be equipped with a drive arrangement, for example a chain drive. Bicycle drive arrangements can be used to transmit the torque from a rider to a rear wheel in order to drive the bicycle. A drive arrangement can for example transmit the torque from a front sprocket arrangement via a chain to a rear sprocket or pinion, for example a pinion of a pinion cassette or of a pinion assembly, in order to drive a rear wheel. Such a drive arrangement can be referred to as drive train.

Sprocket assemblies for bicycles can have one or more individual sprockets. The front sprockets are generally referred to as chain wheels. Chain wheels can be fastened with the aid of a variety of fastening devices. A chain wheel can for example be fastened by chain wheel screws or mounted directly on the crank of a bicycle. The rear sprockets are commonly referred to as pinions. A multiplicity of rear sprockets or pinions may be referred to as a cassette, pinion cassette or pinion assembly. Such a cassette is typically configured such that it can be fastened to a freewheel part of a rear wheel. A cassette can for example be fastened to a freewheel body of a rear wheel with the aid of a spline-type and/or threaded connection.

The alignment of a front chain wheel group with a rear pinion cassette influences the performance of the chain. For example, a front chain wheel assembly may have a single chain wheel which is aligned with one particular pinion of the rear pinion cassette. When the chain connects the individual chain wheel to said substantially aligned individual rear pinion, the chain is subjected to little or no lateral load. However, if the chain is moved laterally to another pinion of the cassette, for example by a rear derailleur or a rear gearshift mechanism of a derailleur system of the drive train, the chain is subjected to a certain lateral loading. Correspondingly lateral loading of the chain arises if the front chain wheel assembly has multiple chain wheels, between which the chain is moved by a front derailleur or a front gearshift mechanism of the derailleur system.

For good performance of a derailleur system of said type, the functionality and performance of the rear derailleur, also referred to in the technical field as rear bicycle derailleur or rear gearshift mechanism, are of particular importance. Said rear derailleur serves not only for performing gearshift processes by transferring the chain between multiple adjacent pinions of the pinion set of the bicycle. A further, likewise highly important function of the derailleur is that of ensuring an adequate chain tension. For this purpose, a rear derailleur generally has the following construction. A base element, also referred to in the technical field as B knuckle, is provided, by which the derailleur is mounted on the bicycle. Furthermore, there is a movable element, also referred to in the technical field as P knuckle, which is movably coupled to the base element, and a chain guide, which is generally designed as a chain cage and which is movably coupled to the movable element for rotation with respect to an axis of rotation. The movable element is movable in a lateral (axial) direction in order to move the chain guide between the pinions of the pinion set, such that the chain can be transferred from a starting pinion to a target pinion. The chain guide is elastically preloaded in one direction of rotation, specifically in the direction of tensioning of the bicycle chain guided by the chain guide, by a tension spring or the like in order to keep the chain in the tensioned state or restore the tensioned state after a previous state of inadequate chain tension. This direction of rotation or pivoting is also referred to here as "chain tensioning direction". A rotation of the chain guide in this direction increases the chain tension and at the same time reduces the tension of the tension spring acting on the chain guide.

Depending on which pinion of the pinion set is presently in engagement with the chain at a given point in time, the chain guide will assume different pivoting positions relative to the movable element with respect to the axis of rotation.

Actions on the chain and the chain guide arise not only from the shifting of the derailleur system, owing to transfer of the chain between different pinions of the pinion set, but also from riding operation itself. For example, the derailleur and the chain are subjected, for example during riding on uneven terrain, to impacts and vibrations which can act on the chain guide in a pivoting direction opposite to the "chain tensioning direction". A rotation of the chain guide in this direction which is opposite to the "chain tensioning direction" increases the tension of the tension spring acting on the chain guide, and leads directly to a reduction of the chain tension (for example if a direct action on the chain guide rotates the latter in this direction) or at least to a considerable risk of a subsequent reduction of the chain tension to below the required level. A negative consequence can be decreases in tension of the chain with undesired play or "slackening" of the chain, in the extreme case to the point of the chain jumping off the pinion set.

To counteract such problems, some conventional solutions are configured with an opposing-force generating device, which can also be referred to as damper, damping device or damper assembly, and which provides a resistance with respect to the rotational movement of the chain guide. Some known solutions provide this damping resistance only in that direction of rotation of the chain guide which is opposite to the "chain tensioning direction". For this purpose, some of these known solutions have in each case one freewheel clutch device and one friction device which interact such that the resistance with respect to a rotational movement of the chain guide is effected in the direction of rotation opposite to the "chain tensioning direction".

The movable element and the chain guide are rotatable relative to one another but, by the friction device and the freewheel clutch device, which can also be referred to as one-way clutch, have a frictionally locking rotational driving connection which, owing to the one-way clutch characteristic of the one-way clutch, is effective only for the direction of rotation opposite to the "chain tensioning direction", such that sliding friction which counteracts the rotation occurs only in this direction of rotation. In the other direction of rotation, which corresponds to a backwards rotation of the chain guide in the sense of tensioning of the chain, the chain guide is decoupled from the movable element owing to this one-way clutch characteristic, such that the tensioning of the chain by rotation of the chain guide is not opposed by any resistance, or is at least opposed by no significant resistance.

It can be stated that, in the case of high-grade mountain bikes, gearshift mechanisms with spring-damper systems in the movable element (P knuckle) have become established in recent years. This technology has meanwhile also found use in the cyclocross sector and even in racing bicycles in order to improve the "chain management". The aim of improving the chain management includes reducing all undesired chain movements, such as for example the impacting of the chain against the chain strut, intense chain vibrations during riding, which can lead to the chain being thrown off, or also the sagging of the chain in the load section owing to the torque, imparted by the rider, during freewheeling operation of the rear-wheel hub.

Various damper systems are in use on the market. Here, the damper moment is generally imparted in a direction-dependent manner, such that it takes effect only in the presence of additional, in particular dynamic, chain tension, but does not oppose the chain-tensioning resetting movement of the cage spring.

Important further requirements, and characteristics which are important in practice, of a rear derailleur, irrespective of whether or not this is implemented with a damping device, concern its dimensions, tolerance chains, a rotational mounting of the chain cage, which realizes a defined mobility of the chain cage relative to the movable element (P knuckle), leak-tightness, robustness, operational reliability and assembly and maintenance.

The background to the present disclosure and its various aspects is formed specifically also by the following problems, which are considered in the case of known solutions:

(1) Structural space—the gearshift mechanism is in an exposed position on the bicycle. It must not collide with the wheel or with the chain strut. A generally large ground clearance of exposed components of the bicycle reduces the likelihood of damage as a result of collision with obstructions. Also, the limitation of the structural space in the region of the gearshift mechanism towards the right (the outside) assists in preventing damage when passing through constrictions. This structural space also has particular importance in ensuring collision-free pedalling ("heel clearance"). The development in the direction of short chain struts and the lowest possible Q factor (lateral pedal spacing, cf. for example the explanation given under de.wikipedia.org/wiki/Q-Faktor_%28Fahrrad%29) intensifies this structural space conflict.

(2) Damper moment—in order to ensure an optimum function of the spring/damper unit (if provided) in the system context of the overall drivetrain, the deviation of the damper moment from the intended nominal value should be kept as low as possible. The decrease or increase of the damper moment over the service life of the product is also a problem and should as far as possible be prevented or at least minimized. Essential factors for the damper moment are: the friction diameter and friction surface areas of the friction surfaces, which are provided for example by friction discs; the required contact pressure for generating a corresponding friction moment; and the spring characteristic curve of the preload spring.

(3) Bearing arrangement of the axle of the gearshift mechanism cage—the bearing arrangement of the axle or rotary shaft determines the pivoting movement of the gearshift mechanism cage. The guide roller on the cage ("upper pulley") must be precisely positioned relative to the toothed ring cassette in order to ensure optimum gearshift performance. A small bearing play of this axle and a short tolerance chain in an axial direction are of importance here. Furthermore, the bearing arrangement is subjected to high loading during gearshift processes or under dynamic loads owing to the lever moment of the gearshift mechanism cage. As large as possible a bearing spacing is advantageous here, but is not realized in the prior art.

SUMMARY

According to one aspect, a rear bicycle derailleur includes a base element, a moveable element, a rotary shaft, a chain guide assembly, a first elastic force store device, and a damping device. The base element is mounted on a bicycle frame. The movable element has a receptacle, and the moveable element is movably coupled to the base element. The rotary shaft is mounted in the movable element in the receptacle so as to be rotatable about an axis of rotation. The chain guide assembly is rotatable relative to the movable element about the axis of rotation and is coupled rotationally conjointly to the rotary shaft. The first elastic force store device is configured to exert on the chain guide assembly a preload force which preloads the chain guide assembly in a first direction of rotation relative to the movable element. The damping device is configured to, via the rotary shaft, exert a damping force on the chain guide assembly and support the damping force on a support which is static in relation to the movable element. The damping device includes a coupling device by which the damping device is coupled to at least one of the support and the rotary shaft, and the coupling device is arranged radially within the first elastic force store device within an axial region thereof.

According to a second aspect, a rear bicycle derailleur includes a base element, a moveable element, a rotary shaft, a chain guide assembly, and a first elastic force store device. The base element is mounted on a bicycle frame. The movable element has a receptacle, the moveable element is movably coupled to the base element. The rotary shaft is mounted in the movable element in the receptacle so as to be rotatable about an axis of rotation. The chain guide assembly is rotatable relative to the movable element about the axis of rotation and is coupled rotationally conjointly to the rotary shaft. The first elastic force store device is configured to exert on the chain guide assembly a preload force which preloads the chain guide assembly in a first direction of rotation relative to the movable element, where the first elastic force store device is coupled via the rotary shaft to the chain guide assembly in order to exert the preload force on the chain guide assembly via the rotary shaft.

According to a third aspect, a rear bicycle derailleur includes a base element, a moveable element, a rotary shaft, a chain guide assembly, and a first elastic force store device. The base element is mounted on a bicycle frame. The movable element has a receptacle and is movably coupled to the base element. The rotary shaft is mounted in the movable element in the receptacle so as to be rotatable about an axis of rotation. The chain guide assembly is rotatable relative to the movable element about the axis of rotation and is coupled rotationally conjointly to the rotary shaft. The first elastic force store device is configured to exert on the chain guide assembly a preload force which preloads the chain guide assembly in a first direction of rotation relative to the movable element, where the rotary shaft is rotatably mounted by a rotary bearing arrangement on a cover element which, together with the rotary shaft extending through a passage opening of the cover element, closes the receptacle of the movable element and is fastened to the movable element.

BRIEF DESCRIPTION OF DRAWINGS

FIG. 10 shows a structural unit of a rear derailleur according to a second exemplary embodiment, which is provided for being received in a receptacle of a movable element (P knuckle) functioning as a housing and which includes the rotary shaft, a housing cover and further components of a spring-damper device;

FIG. 11 shows an axial plan view of the housing cover of FIG. 10 as per the viewing direction A in FIG. 10;

FIG. 12 shows an axial plan view of a disc-like or flange-like coupling member of the spring-damper device as per the viewing direction B in FIG. 10;

FIG. 14 shows a radial sectional view, substantially corresponding to FIG. 13, of the movable element (P knuckle) with a region of the chain cage;

FIG. 15 shows an axial plan view of the movable element (P knuckle) together with the chain cage of FIG. 14;

FIG. 17 is an enlarged illustration of the radial sectional view of the movable element (P knuckle) of the known embodiment of FIG. 16a.

Other aspects and advantages of the embodiments disclosed herein will become apparent upon consideration of the following detailed description, where similar or identical structures have similar reference numerals.

DETAILED DESCRIPTION

Figure 1:
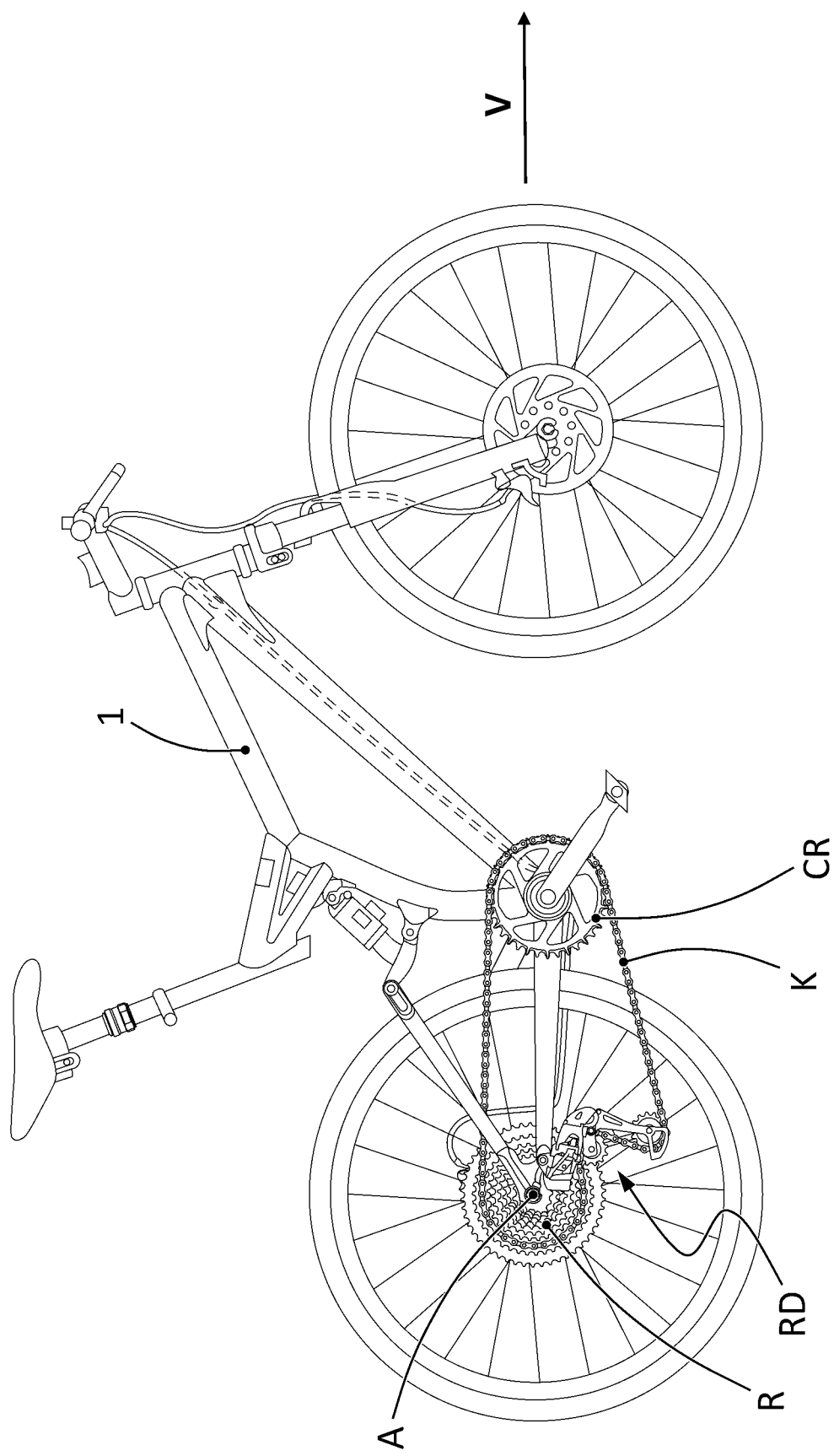
FIG. 1 shows an exemplary bicycle with a rear derailleur according to one embodiment of the disclosure.

A derailleur as discussed is known for example from DE 10 2007 040 156 A1. The known derailleur has a damping device with a friction device formed from a multiplicity of axially supported friction plates. As a freewheel clutch device, a roller-type clutch is arranged radially outside said friction plates in the same axial region, which has the result that relatively large radial dimensions are required for the movable element in a radial direction. As an advantage of this known solution, the laid-open publication highlights a setting unit with an exposed individual nut for setting the frictional engagement and thus the opposing force, which setting unit is intended to enable the opposing force to be able to be set as preferred by the rider. However, a tool is required for such a setting process, and the question arises as to whether a normal rider is actually competent enough to set the correct opposing force, and there is therefore very much a risk of problems in practice. There are also no measures for securing against an undesired adjustment, of which there is a risk owing to the exposed nut, which is not secured against rotation.

DE 10 2011 114 699 A1 and the corresponding U.S. Pat. No. 8,852,041 B2 have also disclosed rear bicycle derailleurs of the type in question in different variants, which likewise use a roller-type clutch. A portion of a rotary shaft, by which the chain guide assembly is mounted so as to be rotatable relative to the movable element, serves as an inner clutch element of the roller-type clutch. The friction device is formed by a leaf spring which is wrapped around the outer clutch element of the roller-type clutch and which projects with two end portions radially between two rotary cams, or alternatively between a setting screw and one rotary cam, which serve for the setting of a basic friction and for the control of a presently acting friction by a control lever or the like, in order that the rider can, in accordance with their demands, for example in a manner dependent on the terrain, select the presently acting friction and thus the presently acting opposing force by the control lever, which is movable between two index positions. Very great mechanical outlay is involved in providing the rider with this selection capability.

DE 10 2013 001 952 A1 and the corresponding US 2013/0203532 A1 have disclosed rear bicycle derailleurs of the type in question in different variants, in the case of which the friction device includes a sleeve-like friction element which extends annularly around a roller-type clutch and which has a tapering or conical outer surface, where the inner element of the roller-type clutch may be formed by a portion, which rotatably bears the chain guide assembly, of the rotary shaft.

EP 0 031 215 B1 discloses different variants of a rear bicycle derailleur of the type in question, which has a ratchet clutch as freewheel clutch device, which, together with a friction device which has axially oriented friction surfaces, forms the damping device.

Furthermore, reference is made to US 2014/0371013 A1, which has likewise disclosed a rear derailleur with a damping device integrated into the movable element. The damping device has a roller-type clutch, a friction device and a preload element assigned to the friction device. The roller-type clutch is arranged axially between the preload element, which imparts an axial preload force, and the friction device. The damping device is arranged radially outside a helical torsion spring which preloads the chain cage in the chain tensioning direction, specifically entirely in the axial region of extent of the helical torsion spring.

Of particular interest in the context of the present description are different variants of rear derailleurs of the type in question which are presented and described in detail in DE 10 2014 225 036 A1 and the corresponding patent specifications U.S. Pat. No. 9,463,846 B2 and EP 2 891 601 B1. The different variants of the rear derailleur each have a damping device which includes a friction device, which provides friction surfaces, and a roller-type clutch. Using terminology used below, DE 10 2014 225 036 A1 and the corresponding patent specifications U.S. Pat. No. 9,463,846 B2 and EP 2 891 601 B1 discloses a rear bicycle derailleur in different variants, which includes: a base element, which can also be referred to as B knuckle and which can be mounted on a bicycle frame; a movable element which can also be referred to as P knuckle and which has a receptacle and which is movably coupled to the base element; a rotary shaft which is mounted in the movable element in the receptacle so as to be rotatable about an axis of rotation; a chain guide assembly which can also be referred to as chain cage and which is rotatable relative to the movable element about the axis of rotation and which is coupled rotationally conjointly to the rotary shaft; a first elastic force store device which is configured to exert on the chain guide assembly a preload force which preloads the chain guide assembly in a first direction of rotation relative to the movable element; and a damping device which is configured to, via the rotary shaft, exert a damping force on the chain guide assembly and support an opposing force, which corresponds to the damping force, on a support which is static in relation to the movable element, where the damping device includes a coupling device by which the damping device is coupled to at least one of the support and the rotary shaft.

The damping device is arranged so as to be axially offset in relation to the first force store device, which preloads the chain cage in the chain tensioning direction and which is in the form of a helical torsion spring, radially within said helical torsion spring. In multiple design variants shown in the figures, the roller-type clutch overlaps the helical torsion spring only slightly or partially, and, in a further design variant shown in the figures, the roller-type clutch does not overlap the helical torsion spring.

The disclosure of the publications DE 10 2014 225 036 A1, U.S. Pat. No. 9,463,846 B2 and EP 2 891 601 B1 is incorporated in its entirety by reference into the disclosure of the present description, because the present description uses the definitions, relationships and component functions expressed in the above-cited documents. Thus, the text and figures of DE 10 2014 225 036 A1, and likewise the text and figures, which are of better drawing quality, of U.S. Pat. No. 9,463,846 B2, are a constituent part of the present description at least in the context of the clarification and use of the definitions and technical relationships expressed in DE 10 2014 225 036 A1 and U.S. Pat. No. 9,463,846 B2.

It is also pointed out here that a damping device of a gearshift mechanism may also be designed as a fluid damper or hydraulic damper, as is known for example from US 2018/0273139 A1.

The present disclosure provides examples of damper assemblies for a bicycle gearshift mechanism that solve or improve upon one or more of the above-noted and/or other disadvantages with prior known devices. The present disclosure relates generally to a rear gearshift mechanism or to a rear derailleur of a bicycle derailleur system, and specifically to the manner in which the movable element (P knuckle), with the components which are assigned thereto and which interact directly or indirectly with the chain cage, is designed, in order to attain an improvement with regard to at least one of the topics discussed.

Various embodiments will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

A benefit provide by the present disclosure is that of providing a rear bicycle derailleur which is in particular of axially compact form.

A further problem addressed by the present disclosure is that of ensuring, in the case of a rear bicycle derailleur with a damping device, a defined damper moment over an assumed service life of the rear bicycle derailleur.

A further problem addressed by the disclosure is that of ensuring a defined mounting, which withstands dynamic loads, of the chain guide assembly via the rotary shaft.

A further problem addressed by the disclosure is that of making efficient production of the bicycle derailleur possible, in particular also with regard to the manufacture of the movable element with the rotary shaft, and associated further components, rotatably mounted therein.

A further problem addressed by the disclosure is that of providing a rear bicycle derailleur which is improved with regard to at least one topic out of the topics discussed in the above presentation of the technical background.

To solve at least one of these problems, the disclosure proposes, according to a first independent aspect, a rear bicycle derailleur which includes: a base element which can be mounted on a bicycle frame; a movable element which has a receptacle and which is movably coupled to the base element; a rotary shaft which is mounted in the movable element in the receptacle so as to be rotatable about an axis of rotation; a chain guide assembly which is rotatable relative to the movable element about the axis of rotation and which is coupled rotationally conjointly to the rotary shaft; a first elastic force store device which is configured to exert on the chain guide assembly a preload force which preloads the chain guide assembly in a first direction of rotation relative to the movable element; and a damping device which is configured to, via the rotary shaft, exert a damping force on the chain guide assembly and support an opposing force, which corresponds to the damping force, on a support which is static in relation to the movable element, where the damping device includes a coupling device by which the damping device is coupled to at least one of the support and the rotary shaft.

According to the disclosure, the rear bicycle derailleur according to the first aspect is distinguished by the fact that the coupling device is arranged radially within the first elastic force store device within the axial region of extent thereof.

In relation to the known solution according to DE 10 2014 225 036 A1 and the corresponding further patent publications, the arrangement according to the disclosure of the coupling device in the axial region of extent of the first elastic force store device, specifically radially within the first elastic force store device, makes possible an axially more compact design of the movable element, and thus of the rear bicycle derailleur as a whole.

It is to be noted that the rotary shaft could itself belong to the coupling device. It is also possible for the coupling device to form the damping device and to then be coupled both to the rotary shaft and to the support.

The damping device may however also comprise at least one further component aside from the coupling devices, for example a friction device which is separate from the coupling device. In this case, it is particularly favourable if the coupling device is either assigned to the rotary shaft, and couples the damping device thereto in order to exert the damping force on the rotary shaft, or is assigned to the support, and couples the damping device thereto in order to support the opposing force.

Preferably, the damping device is received with the rotary shaft in the receptacle. The first elastic force store device could be arranged in a second receptacle of the movable element, as is known per se for example from DE 10 2014 225 036 A1 and the corresponding documents. Particularly preferred, however, is an embodiment in which the first elastic force store device and the damping device are received with the rotary shaft in the receptacle.

It is advantageously possible for a cover element, which is fixed to the movable element and which closes the receptacle, to serve as support, which cover element may have a holder for the damping device or the coupling device thereof.

The damping device may advantageously be configured to exert the damping force on the chain guide assembly via the rotary shaft at least when the chain guide assembly rotates in a second direction of rotation opposite to the first direction of rotation. If the chain guide assembly rotates in the first direction of rotation, the damping force exerted on the chain guide assembly via the rotary shaft may be reduced or may substantially disappear. Such a rotational direction dependency is preferred but not imperative.

The coupling device may advantageously be designed as a friction device which, to generate the damping force, engages in frictionally locking fashion with at least one of the rotary shaft and the support, preferably with the rotary shaft. Consideration may also be given to a simple friction device which does not give rise to rotational direction dependency of the damping force, such as for example an O-ring arrangement as a coupling device which engages in frictionally locking fashion with the rotary shaft.

It is particularly preferable for the coupling device to be designed as a freewheel clutch which is configured to exert the damping force on the chain guide assembly via the rotary shaft or participate in doing so, for example through support of an opposing force in relation to the damping force on the support. With such a freewheel clutch, it is favourably possible to attain the advantageous rotational direction dependency of the damping force. The freewheel clutch may be designed for example as a wrap spring clutch which, to generate the damping force, engages in frictionally locking fashion with the rotary shaft or the support, preferably with the rotary shaft. The damping device of the rear bicycle derailleur can thus be realized very inexpensively.

In a particularly preferred embodiment, the damping device includes, as coupling device, a freewheel clutch which has a radially inner clutch element, a radially outer clutch element and clamping elements between the two clutch elements. The damping device furthermore includes a friction device which has friction surfaces which are preloaded in an axial direction against one another by a second elastic force store device and by which the rotary shaft or the support is coupled to one of the two clutch elements. With such a freewheel clutch, it can be achieved that, in the case of a rotation of the chain guide assembly in the first direction of rotation, practically no relevant damping force is exerted on the chain guide assembly via the rotary shaft.

Preferably, the rotary shaft is coupled by the friction surfaces to one of the two clutch elements, specifically preferably to the radially inner clutch element. The other clutch element is then coupled directly or indirectly to the support, for example in positively locking fashion or by frictional locking, for example with an interference fit. The clamping elements may advantageously be designed as clamping rollers, such that the freewheel clutch is designed as a roller-type freewheel or roller-type clutch.

In accordance with the first aspect of the disclosure, the inner and the outer clutch element of the freewheel clutch may be arranged radially within the first elastic force store device, within the axial region of extent thereof. The freewheel clutch is in this case to be identified as a coupling device according to the disclosure.

With regard to the friction surfaces of the friction device, it is envisaged that these are likewise arranged radially within, and in the axial region of extent of, the first elastic force store device.

The second elastic force store device, which preferably includes a disc spring assembly, may expediently be arranged radially within and so as to axially overlap the first elastic force store device. In particular, it is envisaged that the second elastic force store device is arranged entirely in the axial region of extent of the first elastic force store device, whereby the axial structural space requirement is further reduced.

It may advantageously be provided that the friction surfaces of at least one friction surface pair of the friction device are arranged axially between the second elastic force store device and the freewheel clutch, and the freewheel clutch is axially closer than the second elastic force store device to the chain guide assembly.

In an embodiment, the first elastic force store device may be coupled via the rotary shaft to the chain guide assembly in order to exert the preload force on the chain guide assembly via the rotary shaft.

According to a second aspect which is independent of the first aspect, the disclosure provides a corresponding rear bicycle derailleur as defined in detail below. The disclosure and refinement proposals according to the second aspect, as presented below, are simultaneously also refinement proposals for the rear bicycle derailleur according to the first aspect of the disclosure.

According to a likewise highly advantageous embodiment, it is provided that the rotary shaft is rotatably mounted by a rotary bearing arrangement on a cover element which, together with the rotary shaft extending through a passage opening of the cover element, closes the receptacle of the movable element and is fastened to the movable element.

According to a third aspect which is independent of the first and the second aspect of the disclosure, the embodiment provides a corresponding rear bicycle derailleur as defined in detail below. The embodiment and refinement proposals according to the third aspect of the disclosure, as presented below, are simultaneously refinement proposals for the rear bicycle derailleur according to the first aspect of the disclosure.

To solve at least one of the stated problems, the disclosure provides, according to the discussed second independent aspect, a rear bicycle derailleur which includes: a base element which can be mounted on a bicycle frame; a movable element which has a receptacle and which is movably coupled to the base element; a rotary shaft which is mounted in the movable element in the receptacle so as to be rotatable about an axis of rotation; a chain guide assembly which is rotatable relative to the movable element about the axis of rotation and which is coupled rotationally conjointly to the rotary shaft; and a first elastic force store device which is configured to exert on the chain guide assembly a preload force which preloads the chain guide assembly in a first direction of rotation relative to the movable element.

It is possible, but not imperative, for the rear bicycle derailleur to also have a damping device.

According to the second aspect, it is provided that the first elastic force store device is coupled via the rotary shaft to the chain guide assembly in order to exert the preload force on the chain guide assembly via the rotary shaft.

In the discussed reference of DE 10 2014 225 036 A1/U.S. Pat. No. 9,463,846 B2, the first elastic force store device, which is specifically designed as a helical torsion spring, is arranged in a second receptacle annularly surrounding the receptacle, and, by way of a coupling portion projecting out of said second receptacle, engages in positively locking fashion into an intermediate disc or into the intermediate disc and a cage plate, connected rotationally conjointly thereto, of the chain guide assembly. The rotary shaft serves only for the rotational mounting of the chain guide assembly on or in the movable element and for the coupling of the damping device, which is provided in the case of the known rear derailleur and which is received together with the rotary shaft in the receptacle, to the chain guide assembly.

By contrast, the disclosure proposes, according to the second aspect, that the first elastic force store device, which is likewise designed for example as a helical torsion spring or helical torsion spring arrangement, is coupled via the rotary shaft to the chain guide assembly, which may particularly favourably be realized by connection of the first elastic force store device to an inner end region, remote from the chain guide assembly, of the rotary shaft.

The proposal of the second aspect of the disclosure makes possible a whole series of advantageous configurations of the rear derailleur or of the movable element thereof. It is possible for the first elastic force store device, the rotary shaft and further components to form a pre-assemblable and pre-adjustable assembly which, after adjustment has been completed, is received in the receptacle. An interior space, which includes the receptacle, of the movable element can be easily sealed off with respect to the surroundings and form a type of "hermetically sealed machine housing" for the components received therein. A second receptacle for the first elastic force store device can be omitted and accordingly does not need to be sealed off to the outside if it were sought to provide such a "hermetically sealed machine housing". Such sealing has also not been implemented in the known solutions discussed above because the second receptacle provided there would not be able to be sealed off practically, or would at best be able to be sealed off with great outlay, owing to the large diameter of an air gap caused by the second receptacle and owing to very long tolerance chains in an axial direction. Therefore, in the case of the known solutions, it has been necessary to accept a susceptibility to fouling.

Further advantageous configurations made possible by the disclosure arise from the refinement proposals presented below, which are simultaneously also refinement proposals for the rear derailleur according to the first aspect.

As already mentioned, the rear bicycle derailleur according to the second aspect may also have a damping device which is configured to, via the rotary shaft, exert a damping force on the chain guide assembly and support an opposing force, which corresponds to the damping force, on a support which is static in relation to the movable element, where the damping device includes a coupling device by which the damping device is coupled to at least one of the support and the rotary shaft.

It is to be noted that the rotary shaft could itself belong to the coupling device. It is possible for the coupling device to form the damping device and to then be coupled both to the rotary shaft and to the support. The damping device may however also comprise at least one further component aside from the coupling device, for example a friction device which is separate from the coupling device. In this case, it is particularly favourable if the coupling device is either assigned to the rotary shaft, and couples the damping device thereto in order to exert the damping force on the rotary shaft, or is assigned to the support, and couples the damping device thereto in order to support the opposing force. Preferably, the damping device is received with the rotary shaft in the receptacle. The first elastic force store device could be arranged in a second receptacle of the movable element, as is known per se from DE 10 2014 225 036 A1/US 2016/0304160 A9. Particularly preferred, however, as already mentioned, is an embodiment of this kind in which the first elastic force store device and the damping device are received with the rotary shaft in the receptacle. It is advantageously possible for a cover element, which is fixed to the movable element and which closes the receptacle, to serve as support, which cover element may have a holder for the damping device or the coupling device thereof.

In accordance with the first aspect, it is proposed as a refinement that the coupling device is arranged radially within the first elastic force store device within the axial region of extent thereof. Accordingly, the above-stated refinement proposals relating to the first aspect are simultaneously also refinement proposals for the rear bicycle derailleur according to the second aspect.

In relation to the known solution according to DE 10 2014 225 036 A1 and the corresponding further patent publications, the proposed arrangement of the coupling device in the axial region of extent of the first elastic force store device, specifically radially within the first elastic force store device, makes possible an axially more compact design of the movable element, and thus of the rear bicycle derailleur as a whole.

It is envisaged in particular that the damping device is configured to exert the damping force on the chain guide assembly via the rotary shaft at least when the chain guide assembly rotates in a second direction of rotation opposite to the first direction of rotation. If the chain guide assembly rotates in the first direction of rotation, the damping force exerted on the chain guide assembly via the rotary shaft may be reduced or may substantially disappear. As discussed in conjunction with the first aspect of the disclosure, a rotational direction dependency of the damping force is preferred but not imperative.

The coupling device may be designed as a friction device which, to generate the damping force, engages in frictionally locking fashion with at least one of the rotary shaft and the support, preferably with the rotary shaft. Consideration may also be given to a very simple friction device, such as for example an O-ring arrangement, as a coupling device which engages in frictionally locking fashion with the rotary shaft.

According to one expedient embodiment, the coupling device may be designed as a freewheel clutch which is configured to exert the damping force on the chain guide assembly via the rotary shaft or participate in doing so, for example through support of an opposing force in relation to the damping force on the support. In a solution which can be realized inexpensively, the freewheel clutch is designed as a wrap spring clutch which, to generate the damping force, engages in frictionally locking fashion with the rotary shaft or the support, preferably with the rotary shaft.

What is particularly preferred, however, is an implementation in which the damping device includes, as coupling device, a freewheel clutch which has a radially inner clutch element, a radially outer clutch element and clamping elements between the two clutch elements. In this case, the damping device furthermore includes a friction device which has friction surfaces which are preloaded in an axial direction against one another by a second elastic force store device and by which the rotary shaft or the support is coupled to one of the two clutch elements.

Preferably, the rotary shaft is coupled to one of the two clutch elements. Here, it is envisaged in particular that the radially inner clutch element is coupled by the friction surfaces to the rotary shaft. The other clutch element is then coupled directly or indirectly to the support, for example in positively locking fashion or by frictional locking, for example with an interference fit. The clamping elements may advantageously be designed as clamping rollers, such that the freewheel clutch is designed as a roller-type freewheel or roller-type clutch.

In a refinement, it is proposed that the second elastic force store device, which preferably includes a disc spring assembly, is arranged radially within and so as to axially overlap the first elastic force store device. This embodiment also contributes to an axially compact design of the movable element (P knuckle). For this purpose, the second elastic force store device may also be arranged entirely in the axial region of extent of the first elastic force store device.

With regard to the relative arrangement of the various components in the receptacle of the movable element, there is basically a wide variety of possibilities. It is proposed as being particularly favourable that the friction surfaces of at least one friction surface pair of the friction device are arranged axially between the second elastic force store device and the freewheel clutch, and the freewheel clutch is axially closer than the second elastic force store device to the chain guide assembly. It may also be provided that friction surfaces of the friction device are arranged radially within and in the axial region of extent of the first elastic force store device.

According to a particularly advantageous implementation, the rotary shaft and the damping device are integrated into a structural unit which is or can be received in the receptacle of the movable element and which is or can be fastened to the movable element. The structural unit may have a cover element which is axially closely adjacent to the chain guide assembly and which, together with the rotary shaft extending through a passage opening of the cover element, closes the receptacle and is fastened or fastenable to the movable element. It is particularly favourable if the first elastic force store device, which is preferably designed as a helical torsion spring arrangement, is also integrated into the structural unit.

If no damping device is provided, the structural unit may comprise the rotary shaft, the cover element and the first elastic force store device.

The provision of the structural unit permits pre-assembly and pre-adjustment, outside the movable element, of those components which are to be received in the receptacle, which facilitates the corresponding working processes and thus makes efficient assembly and thus production of the rear derailleur possible.

It may favourably be provided that a/the cover element which closes the receptacle has a holder for the damping device or a/the freewheel clutch of the damping device, by which holder an opposing force in relation to the damping force exerted on the chain guide assembly via the rotary shaft is supported on the cover element and thus indirectly on the movable element.

The holder may be formed by a sleeve portion which projects axially into the receptacle from an inner side of the cover element or by multiple holder projections which project axially into the receptacle from the inner side of the cover element and which are offset with respect to one another in a circumferential direction. Then, the damping device or—if provided—a radially outer clutch element, which is possibly designed as a clutch sleeve, of the freewheel clutch, which is preferably designed as a roller-type clutch, may be received rotationally fixedly in the sleeve portion or between the holder projections.

For the desired axially compact design of the movable element, the freewheel clutch may be arranged radially within and so as to axially overlap the first force store device, preferably entirely in the axial region of extent of the first elastic force store device. The freewheel clutch is thus to be identified as a coupling device in the context of the first aspect of the disclosure.

In general, it is proposed that the damping device or a/the freewheel clutch of the damping device is arranged entirely in the axial region of extent of the first elastic force store device.

With regard to the bearing arrangement of the rotary shaft, it is proposed that said rotary shaft is rotatably mounted on the movable element by a first rotary bearing arrangement which is provided at a region, delimiting the receptacle in an axial direction and averted from the chain guide assembly, of the movable element. As in the references, it would be possible for the receptacle or the movable element here to have an opening into which a bearing portion of the rotary shaft engages. By contrast, it is however preferable that the first rotary bearing arrangement includes a bearing journal, which projects into the receptacle, and a bearing bushing, which receives the bearing journal, where the rotary shaft is rotatably mounted on the bearing journal by the bearing bushing. This makes it possible for the movable element to be of closed design at the side averted from the chain guide assembly, such that a cover element is not required on said side of the movable element, and there is no need for sealing.

The bearing journal and the bearing bushing may advantageously form a plain bearing for the rotary shaft. In a particularly expedient embodiment, the bearing bushing includes an axial bore which is formed in an end region of the rotary shaft and in which the bearing journal is received. The bearing bushing may thus be formed integrally with the rotary shaft.

A/the cover element which closes the receptacle may favourably be formed, at an outer circumference, with at least one fastening formation which engages in positively locking, frictionally locking or cohesive fashion with at least one counterpart fastening formation of the movable element at an inner circumference of the receptacle. It is thus possible for the cover element to be received, for firm frictionally locking engagement, with an interference fit in an end region of the receptacle. For cohesive engagement, consideration may be given specifically to adhesive bonding. For frictionally locking or cohesive engagement, the fastening formation, at the outer circumference, and the counterpart fastening formation, at the inner circumference, may simply be formed as suitably configured, substantially unstructured circumferential surfaces. Suitable positively locking engagement can be attained by a screw or bayonet connection between the cover element and the movable element at the inner circumference of the receptacle. It is envisaged that the cover element has an external thread as fastening formation and the movable element has an internal thread as counterpart fastening formation. The threads are preferably of multi-start design.

As already discussed, an interior space of the receptacle, which is delimited by the movable element and by a/the cover element which closes the receptacle, may be sealed off to the outside. Thus, the movable element together with the cover element may form a hermetically sealed machine housing for the components arranged in the receptacle, which is highly advantageous for ensuring defined characteristics over a long service life. Corrosion and the ingress of dirt can thus be avoided.

According to a particularly preferred embodiment, the rotary shaft is rotatably mounted on a/the cover element, which closes the receptacle, by a second rotary bearing arrangement which is provided in the region of the passage opening or closely adjacent thereto.

According to the discussed reference of DE 10 2014 225 036 A1/U.S. Pat. No. 9,463,846 B2, the rotary shaft is mounted directly or indirectly on inner circumferential portions of the movable element. That bearing point which is closer to the chain guide assembly is, owing to said intermediate disc, relocated somewhat into the interior region of the movable element. The mounting, proposed here, of the rotary shaft on the cover element and thus indirectly on the movable element makes it possible for said bearing point to be offset somewhat radially outwards in the direction of the chain guide assembly, and, in conjunction with the first rotary bearing arrangement, for a particularly large bearing spacing to be attainable, for precise mounting of the rotary shaft. It is possible to ensure a smaller bearing play for the rotary shaft and a shorter tolerance chain in an axial direction.

The proposed mounting of the rotary shaft on a cover element of said type and thus, by the cover element, only indirectly on the movable element is also of interest, and worthy of protection, independently of the proposal of the second aspect and also independently of the provision of a damping device. Accordingly, according to a third aspect which is independent of the first aspect and second aspect, the disclosure provides a corresponding rear derailleur as defined in detail below. The refinement proposals presented below for the rear derailleur of the third aspect are simultaneously also refinement proposals for the disclosure according to the second aspect.

It may expediently be provided that the second rotary bearing arrangement includes an inner circumferential surface of the passage opening, which, together with an outer circumferential surface of the rotary shaft, forms a plain bearing.

With regard to the arrangement and in particular connection of the first elastic force store device, it is proposed that said first elastic force store device is coupled in positively locking fashion at a first coupling region to a/the cover element, which closes the receptacle, and is coupled in positively locking fashion at a second coupling region to a coupling member, which projects radially from the rotary shaft and which is coupled rotationally conjointly on the rotary shaft, in order to exert the preload force via the coupling member on the rotary shaft and thus on the chain guide assembly. The opposing force in relation to the preload force is supported on the cover element and thus indirectly on the movable element.

The coupling element may be of single-part form or else multi-part form, for example two-part form. The latter may offer advantages for production and assembly. Specifically, a disc-like or flange-like element is preferred, which, depending on configuration, may also be referred to as spring flange or spring disc.

It may expediently be provided that friction surfaces, coupled or couplable to the rotary shaft, of a/the damping device are preloaded against one another by a/the second elastic force store device, and that the coupling member is subjected to an axial pressure force exerted by the second elastic force store device and supports said axial pressure force on the rotary shaft or participates in supporting the exerted axial pressure force on the rotary shaft. The coupling member can thus perform multiple functions, which makes a compact construction possible.

Specifically, it is envisaged that the second elastic force store device axially preloads the coupling member, which is arranged axially movably on the rotary shaft in a region of the latter which is spaced apart from the cover element. It is furthermore proposed that the friction surfaces are provided by a support arrangement by which an axial pressure force exerted by the second elastic force store device is supported on the rotary shaft. These embodiments are also advantageous, in particular because they are favourable for a compact construction.

According to the particularly preferred embodiment, first and second axial pressure forces exerted by the second elastic force store device in opposite axial directions are both supported on the rotary shaft, producing a closed force flow, specifically preferably without participation of the movable element, via which said force flow therefore does not run. According to the reference DE 10 2014 225 036 A1/U.S. Pat. No. 9,463,346 B2, the movable element participates in supporting the pressure forces of the second elastic force store device belonging to the damping device, which, according to the refinement proposal, can be omitted.

In one favourable embodiment, it is provided that a sleeve element of the support arrangement, which sleeve element forms a/the radially inner clutch element of a/the freewheel clutch or is received rotationally conjointly in the radially inner clutch element, designed as clutch sleeve, of the freewheel clutch, provides at least one friction surface of the damping device. Here, the sleeve element may, at a flange portion, provide a first friction surface of the damping device, and a friction member, which is axially adjacent to the flange portion and which is held axially movably but rotationally conjointly on the rotary shaft, of the support arrangement may provide a second friction surface, which engages in frictionally locking fashion with the first friction surface, of the damping device.

According to a favourable first variant, a friction disc which is held axially movably but rotationally conjointly on the rotary shaft forms the friction member. Said friction member preferably does not participate in exerting the preload force of the first elastic force store device on the chain guide assembly via the rotary shaft.

According to a favourable second variant, a/the coupling member that is coupled in positively locking fashion to a coupling region of the first elastic force store device forms the friction member. Said coupling member then participates in exerting the preload force of the first elastic force store device on the chain guide assembly via the rotary shaft.

The friction device may also be equipped with further friction surfaces. Accordingly, the sleeve element may, at an end region opposite the flange portion, provide a third friction surface, and a surface structure of the rotary shaft may provide a fourth friction surface, which engages in frictionally locking fashion with the second friction surface, of the friction device.

Advantageously, the third and the fourth friction surface may be designed as friction surfaces which run obliquely with respect to the axis of rotation in a cross section relative to a radial plane. In this way, an advantageous centring action can be attained, and the surface areas of the friction surfaces are enlarged in relation to axial friction surfaces, that is to say axially directed friction surfaces.

It is also possible for further friction surface pairings to be provided in order to correspondingly dimension the damping force of the damping device. The damping force is determined or co-determined by the surface areas of the friction surfaces, the effective radii of the friction surfaces and the preload force of the second force store device.

Advantageously, a setting element may be provided which, at an internal thread, is in threaded engagement at an external thread with an external thread of the rotary shaft and serves for the setting of an axial preload force of the second elastic force store device. It is preferable if the external thread is arranged at an end region, spaced apart from the chain guide assembly, of the rotary shaft, such that the setting element is arranged at the inside in the receptacle of the movable element. This prevents or impedes an authorised adjustment of the setting element by a user. It is rather the intention for the setting of the axial preload force of the second elastic force store device to be performed during the production of the rear derailleur.

The setting element may, independently of the preferably concealed arrangement of the setting element in the interior of the movable element, be secured against adjustment in order to maintain a factory setting of the axial preload force of the second elastic force store device. As securing measures, use may be made of caulking and other screw-securing means, including adhesive bonding.

In conjunction with the setting element, it is proposed in a refinement that a first axial pressure force exerted by the second elastic force store device is supported on the rotary shaft via the setting element, and a second axial pressure force exerted by the second elastic force store device and directed oppositely to the first axial pressure force is supported on the rotary shaft via a support arrangement, which includes the friction surfaces.

According to a/the first variant, it is furthermore proposed in this regard that the setting element defines an axial stop for a/the coupling member which is coupled in positively locking fashion to a coupling region of the first elastic force store device and which participates in exerting the preload force of the first elastic force store device on the chain guide assembly via the rotary shaft, where the first axial pressure force exerted by the second elastic force store device is supported on the rotary shaft via the coupling member and the setting element. Alternatively, according to a/the second variant, it is favourable for the support arrangement to comprise a/the coupling member which is coupled in positively locking fashion to a coupling region of the first elastic force store device and which participates in exerting the preload force of the first elastic force store device on the chain guide assembly via the rotary shaft. The coupling member may then advantageously serve as friction member of the/a friction device.

According to the discussed third aspect, which is independent of the first and the second aspect, of the disclosure, said third aspect provides a rear bicycle derailleur which includes: a base element which can be mounted on a bicycle frame; a movable element which has a receptacle and which is movably coupled to the base element; a rotary shaft which is mounted in the movable element in the receptacle so as to be rotatable about an axis of rotation; a chain guide assembly which is rotatable relative to the movable element about the axis of rotation and which is coupled rotationally conjointly to the rotary shaft; and a first elastic force store device which is configured to exert on the chain guide assembly a preload force which preloads the chain guide assembly in a first direction of rotation relative to the movable element.

It is possible for the bicycle derailleur to be formed with a damping device. This is however not imperative.

According to the disclosure, it is proposed according to the third aspect that the rotary shaft is rotatably mounted by a rotary bearing arrangement on a cover element which, together with the rotary shaft extending through a passage opening of the cover element, closes the receptacle of the movable element and is fastened to the movable element. Various advantageous embodiments are made possible in this way. One advantage is that the rotary bearing arrangement provided on the cover element can, with regard to the receptacle of the movable element, be provided with a small axial spacing to the chain guide assembly, which makes a relatively large bearing spacing possible in conjunction with a further rotary bearing, which is preferably to be provided, for the rotary shaft. In the case of DE 10 2014 225 036 A1/U.S. Pat. No. 9,463,846 B2, owing to an intermediate disc arranged rotationally conjointly at the inside on a cage plate of the chain guide assembly, that rotary bearing which is axially closer to the chain guide assembly is offset somewhat inwards into the receptacle. According to the proposal, it is furthermore possible to realize a small bearing play for the rotary shaft and a short tolerance chain in an axial direction. The rotary shaft is, by the cover element, mounted indirectly on the movable element by the rotary bearing arrangement according to the disclosure.

The refinement proposals presented below for the rear bicycle derailleur according to the disclosure according to the third aspect are simultaneously also refinement proposals for the rear bicycle derailleur according to the first aspect and refinement proposals for the rear bicycle derailleur according to the second aspect of the disclosure.

It may advantageously be provided that the first elastic force store device, which is preferably designed as a helical torsion spring arrangement, is also received in the receptacle.

With regard to the cover element, it is proposed that this is formed, at an outer circumference, with at least one fastening formation which engages in positively locking, frictionally locking or cohesive fashion with at least one counterpart fastening formation of the movable element at an inner circumference of the receptacle. It is thus possible for the cover element to be received, for firm frictionally locking engagement, with an interference fit in an end region of the receptacle. For cohesive engagement, consideration may be given specifically to adhesive bonding. For frictionally locking or cohesive engagement, the fastening formation, at the outer circumference, and the counterpart fastening formation, at the inner circumference, may simply be formed as suitably configured circumferential surfaces, substantially unstructured circumferential surfaces. Suitable positively locking engagement can be attained by a screw or bayonet connection between the cover element and the movable element at the inner circumference of the receptacle. It is envisaged that the cover element has an external thread as fastening formation and the movable element has an internal thread as counterpart fastening formation. The threads are preferably of multi-start design.

With regard to the rotary bearing arrangement, it is envisaged in particular that this is provided in the region of the passage opening or closely adjacent thereto. The rotary bearing arrangement may comprise an inner circumferential surface of the passage opening, which, with an outer circumferential surface of the rotary shaft, forms a plain bearing.

The rotary bearing arrangement according to the disclosure corresponds to the second rotary bearing arrangement according to the discussed refinement proposals relating to the rear derailleur of the second aspect of the disclosure.

The rotary shaft may advantageously be rotatably mounted on the movable element by a further rotary bearing arrangement. Preferably, said further rotary bearing arrangement is provided at a region, delimiting the receptacle in an axial direction and averted from the chain guide assembly, of the movable element. As in the references, it would be possible for the receptacle or the movable element here to have an opening into which a bearing portion of the rotary shaft engages. By contrast, it is however preferable that the first rotary bearing arrangement includes a bearing journal, which projects into the receptacle, and a bearing bushing, which receives the bearing journal, where the rotary shaft is rotatably mounted on the bearing journal by the bearing bushing. This makes it possible for the movable element to be of closed design at the side averted from the chain guide assembly, such that a cover element is not required on said side of the movable element, and there is no need for sealing.

The bearing journal and the bearing bushing may form a plain bearing for the rotary shaft. The bearing bushing may advantageously comprise an axial bore which is formed in an end region of the rotary shaft and in which the bearing journal is received. The bearing bushing may thus be formed integrally with the rotary shaft.

The proposed further rotary bearing arrangement corresponds to the first rotary bearing arrangement according to the refinement proposals relating to the rear bicycle derailleur of the second aspect of the disclosure.

An interior space of the receptacle, which is delimited by the movable element and by the cover element, may favourably be sealed off to the outside. The movable element together with the cover element may advantageously form a hermetically sealed machine housing for the components arranged in the receptacle.

The cover element may be integrated with the rotary shaft and preferably also the first elastic force store device to form a structural unit which is or can be received in the receptacle of the movable element and which is or can be fastened to the movable element.

For the rear bicycle derailleur according to the third aspect of the disclosure, too, it is proposed that this is formed with a damping device which is configured to, via the rotary shaft, exert a damping force on the chain guide assembly and support an opposing force, which corresponds to the damping force, on a support which is static in relation to the movable element, where the damping device includes a coupling device by which the damping device is coupled to at least one of the support and the rotary shaft.

It is to be noted that the rotary shaft could itself belong to the coupling device. The coupling device may form the damping device and is then coupled both to the rotary shaft and to the support. The damping device may however also comprise at least one further component aside from the coupling device, for example a friction device which is separate from the coupling device. In this case, it is particularly favourable if the coupling device is either assigned to the rotary shaft, and couples the damping device thereto in order to exert the damping force on the rotary shaft, or is assigned to the support, and couples the damping device thereto in order to support the opposing force. Preferably, the damping device is received with the rotary shaft in the receptacle. The first elastic force store device could be arranged in a second receptacle of the movable element, as is known per se from DE 10 2014 225 036 A1/U.S. Pat. No. 9,463,846 B2. By contrast, an embodiment of this kind is preferred, however, in which the first elastic force store device and the damping device are received with the rotary shaft in the receptacle. These components may be integrated with the cover element according to the disclosure to form a structural unit, which can be or is received in the receptacle of the movable element and which is or can be fastened to the movable element.

According to a particularly preferred embodiment corresponding to the proposal according to the first aspect of the disclosure, the coupling device is arranged radially within the first elastic force store device within the axial region of extent thereof, in order to realize an axially compact structural form. Accordingly, the above-stated refinement proposals relating to the rear derailleur of the first aspect are simultaneously also refinement proposals for the rear derailleur according to the third aspect.

It is furthermore highly favourable and preferable if the first elastic force store device is coupled to the chain guide assembly via the rotary shaft in order to exert the preload force on the chain guide assembly via the rotary shaft. The advantages of the rear bicycle derailleur according to the second aspect of the disclosure are attained. Accordingly, the above-stated refinement proposals relating to the rear derailleur according to the second aspect of the disclosure are simultaneously also refinement proposals for the rear derailleur according to the third aspect of the disclosure.

The disclosure will be discussed in detail below on the basis of exemplary embodiments which are shown in the figures and which serve merely as non-limiting examples.

FIG. 1 shows, by way of example, a bicycle with a conventional bicycle drive. The bicycle drive includes a front sprocket CR, a rear pinion assembly R and a chain K, which can be moved from one pinion to the next by the rear derailleur RD. The directional specifications right/left and front/rear used below relate to a bicycle in a direction of travel, that is to say correspond to the perspective of the rider on the bicycle. The bicycle frame 1 typically has a left-hand and a right-hand rear dropout or frame hanger, between which the rear wheel is mounted. The rear wheel rotates together with the pinion assembly R about the rear-wheel axis A. "Axially" relates to the rear-wheel axis A or the axis of rotation A of the multi-pinion arrangement R or a direction parallel to this, or to the axis of rotation of a rotary shaft which serves for the mounting of a chain cage of the rear derailleur on the movable element (P knuckle). The largest pinion is situated axially further to the inside than the smaller pinions. The teeth are arranged radially at the outside on the pinions. The gearshift mechanism RD shown here is fastened in the conventional manner by a hanger to the right-hand dropout of the frame. The pivot mechanism of the rear derailleur is configured as an oblique parallelogram.

Without restricting the general nature, preferred embodiments of the rear derailleur according to the disclosure which serve for the explanation of the disclosure will emerge from the following description and from the figures referred to therein. In this description, reference designations based on the reference designations in the description of DE 10 2014 225 036 A1/U.S. Pat. No. 9,463,846 B2 are used, in part, for corresponding or analogous components and elements, said reference designations corresponding in terms of the unit positions and tens positions of the reference numerals used as reference designations to the reference designations of DE 10 2014 225 036 A1/U.S. Pat. No. 9,463,846 B2.

A first exemplary embodiment for a bicycle derailleur according to the disclosure, which includes a damper assembly according to a first design approach, is shown in various views in FIGS. 2 to 5 and 7 to 9.

The rear bicycle derailleur 10 has a base element (B knuckle) 12 and a swing arm 18, which in the present case is formed as a parallelogram and which is formed for example with two connecting elements 20 and 22 which are rotatably connected to fastening portions of the base element 12. A movable element (P knuckle) 16 is connected to the swing arm at an end region, opposite the base element 12, of the swing arm 18, in this case to those ends of the connecting elements 20 and 22 which are situated opposite the base element 12, such that the movable element is, by the swing arm 18, movable in a manner known per se in a lateral direction relative to a bicycle frame in order, by a chain guide arrangement or chain guide assembly 25 represented in FIG. 2 by a cage plate 28, to transfer the chain of a derailleur system between pinions of a pinion set of the rear wheel of the bicycle.

The base element 12, also known as "B knuckle", may be attached to a bicycle frame 1 for example by a fastening element 14, for example a screw. A pair of rotary journals, which may be in the form of bolts, connect the base element 12 to the swing arm 18.

The swing arm 18 includes an outer connecting element 20 as already discussed and an inner connecting element 22 as already discussed. Furthermore, the swing arm 18 may comprise at least one preload element (not visible in FIG. 2), for example in the form of a spring, for bracing the derailleur 10 in the direction of a starting travel position, as is generally known. By contrast, in the case of an electrically actuated derailleur, such a preload element does not need to be provided.

The movable element 16, also known as "P knuckle", is attached pivotably to the swing arm by a pair of further rotary journals, in a similar manner to the base element 12. In principle, any desired method of coupling the movable element 16 to the base element 12 are conceivable in the context of the disclosure.

Figure 2:
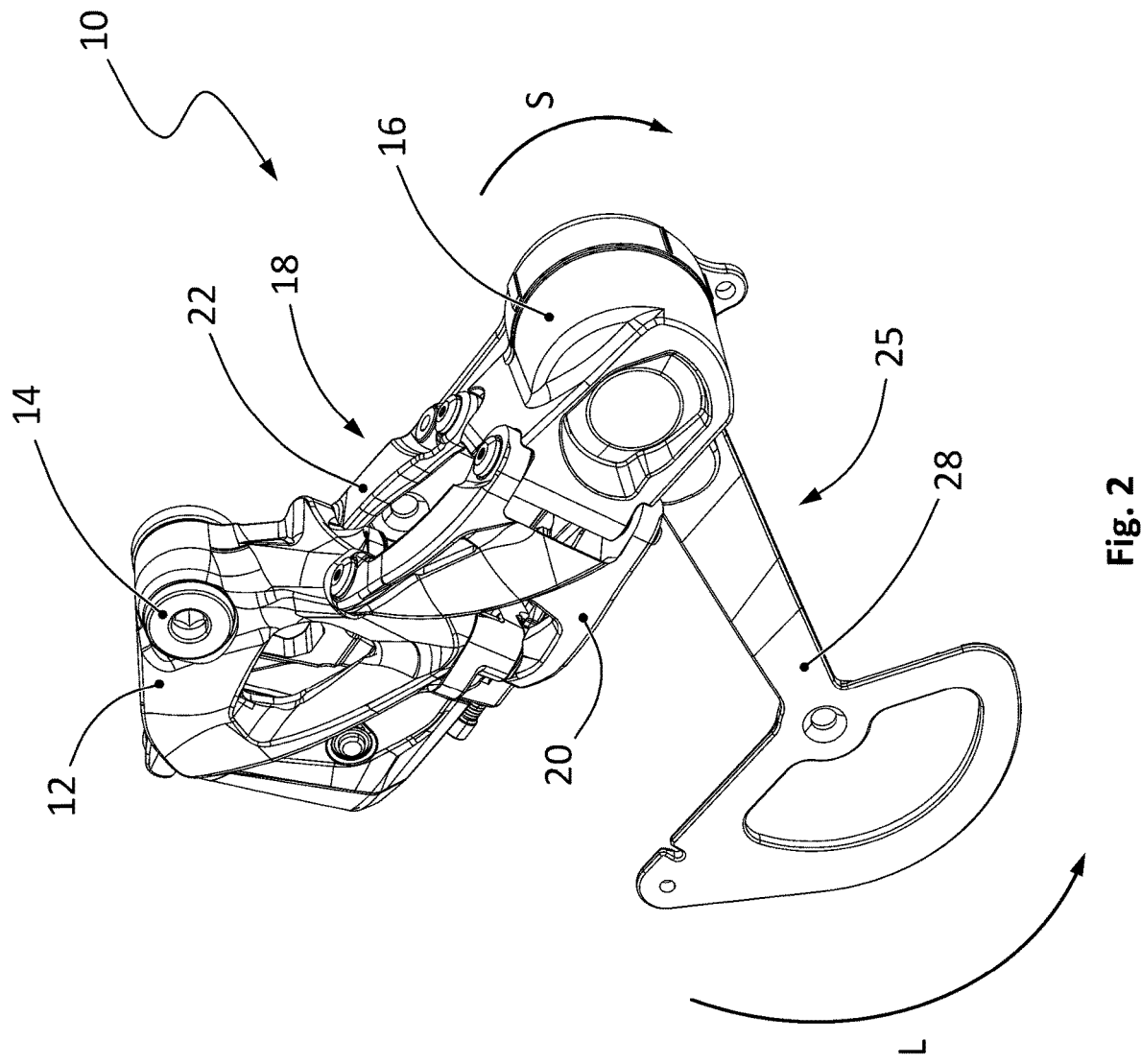
FIG. 2 shows a rear derailleur according to a first exemplary embodiment in a perspective lateral view.
Figure 13:
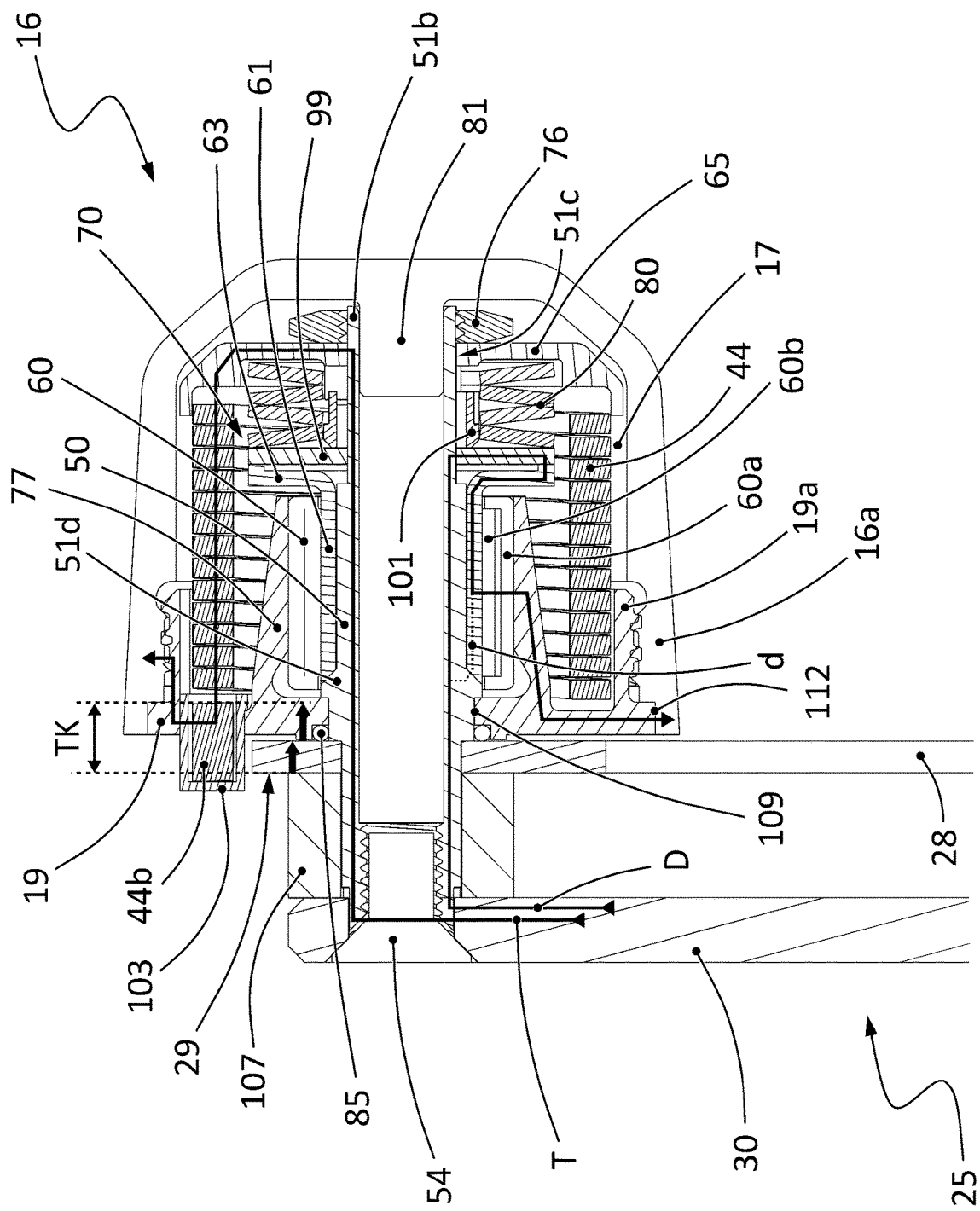
FIG. 13 shows the structural unit of FIG. 10, in the state in which it is received in the receptacle of the movable element (P knuckle) and fastened thereto, together with a portion of the chain cage, in a radial section plane.

The chain guide assembly 25 may comprise a chain guide 26 (cf. FIGS. 14 and 15 relating to the second exemplary embodiment), also known as chain cage, preferably with a pair of spaced-apart cage plates, the outer cage plate 28 shown in FIG. 2 and an inner cage plate (cf. the inner cage plate 30 of FIGS. 13 to 15 relating to the second exemplary embodiment). Between the two cage plates, there may be rotatably arranged a pair of guide wheels for guiding a chain (not illustrated), specifically an upper guide wheel (cf. the upper guide wheel 32, also known as guide roller, of FIGS. 14 and 15 relating to the second exemplary embodiment) and a lower guide wheel.

Figure 3:
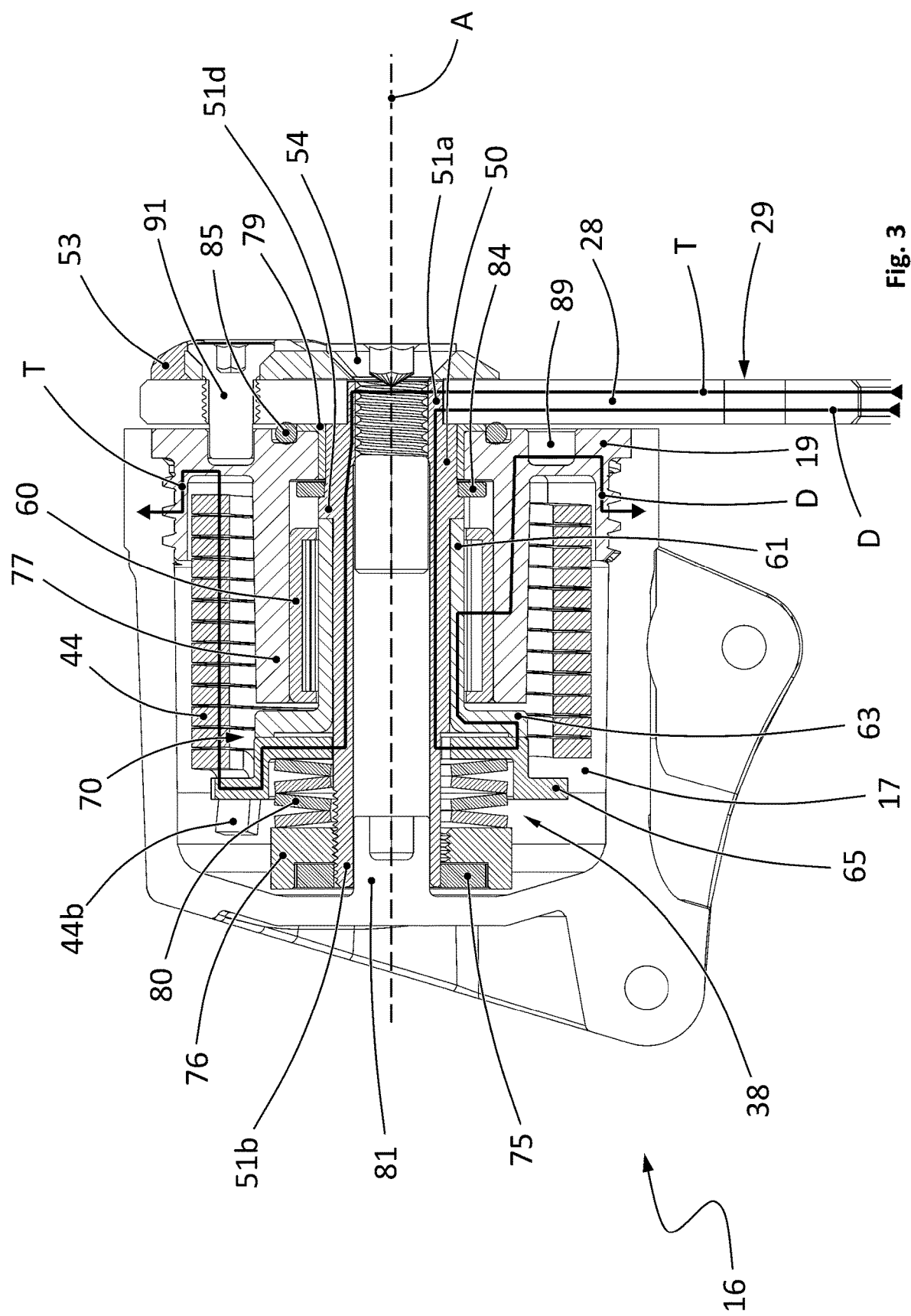
FIG. 3 shows a sectional view of the movable element (P knuckle) of the derailleur of FIG. 2 in a radial section plane.
Figure 4:
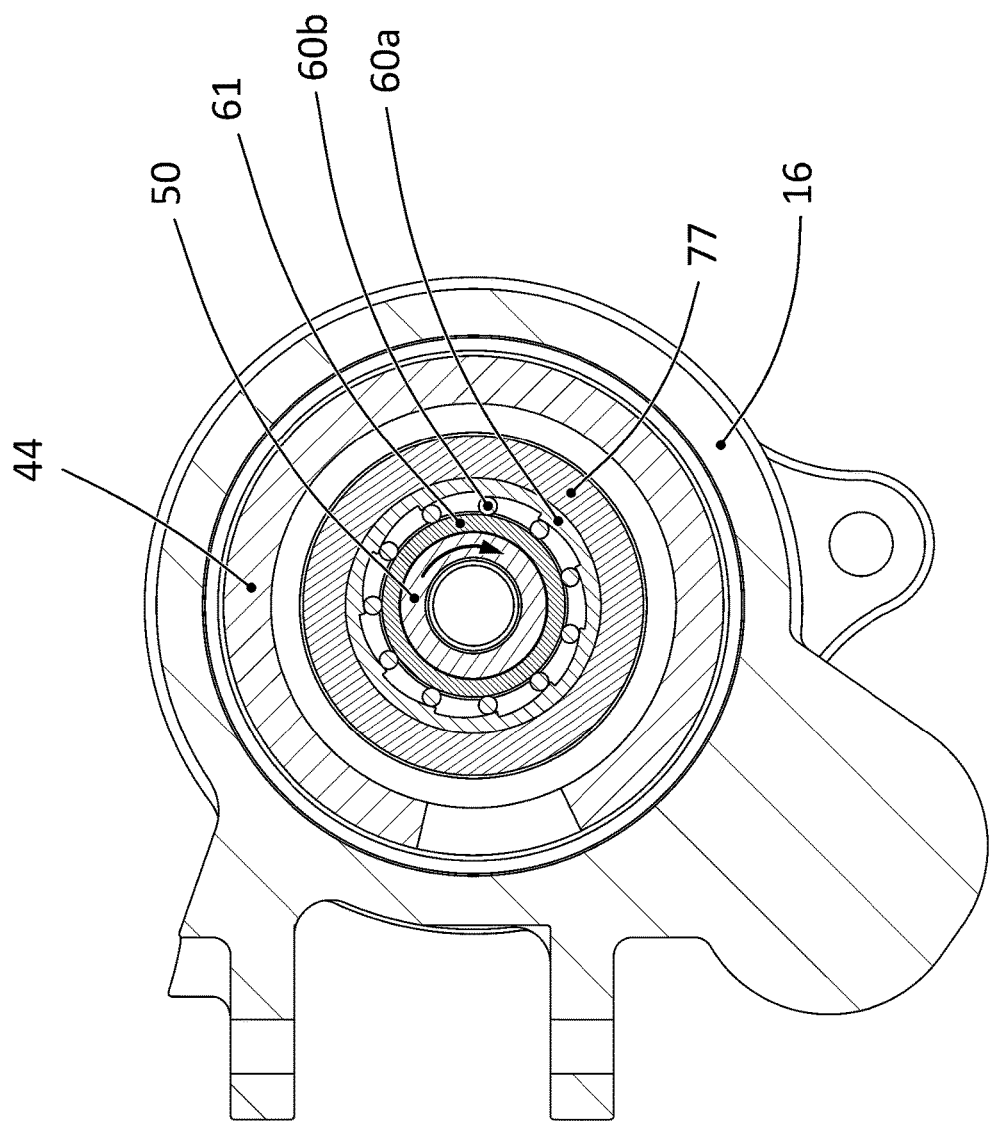
FIG. 4 shows a sectional view of the movable element of the derailleur of FIG. 2 in an axial section plane.
Figure 5:
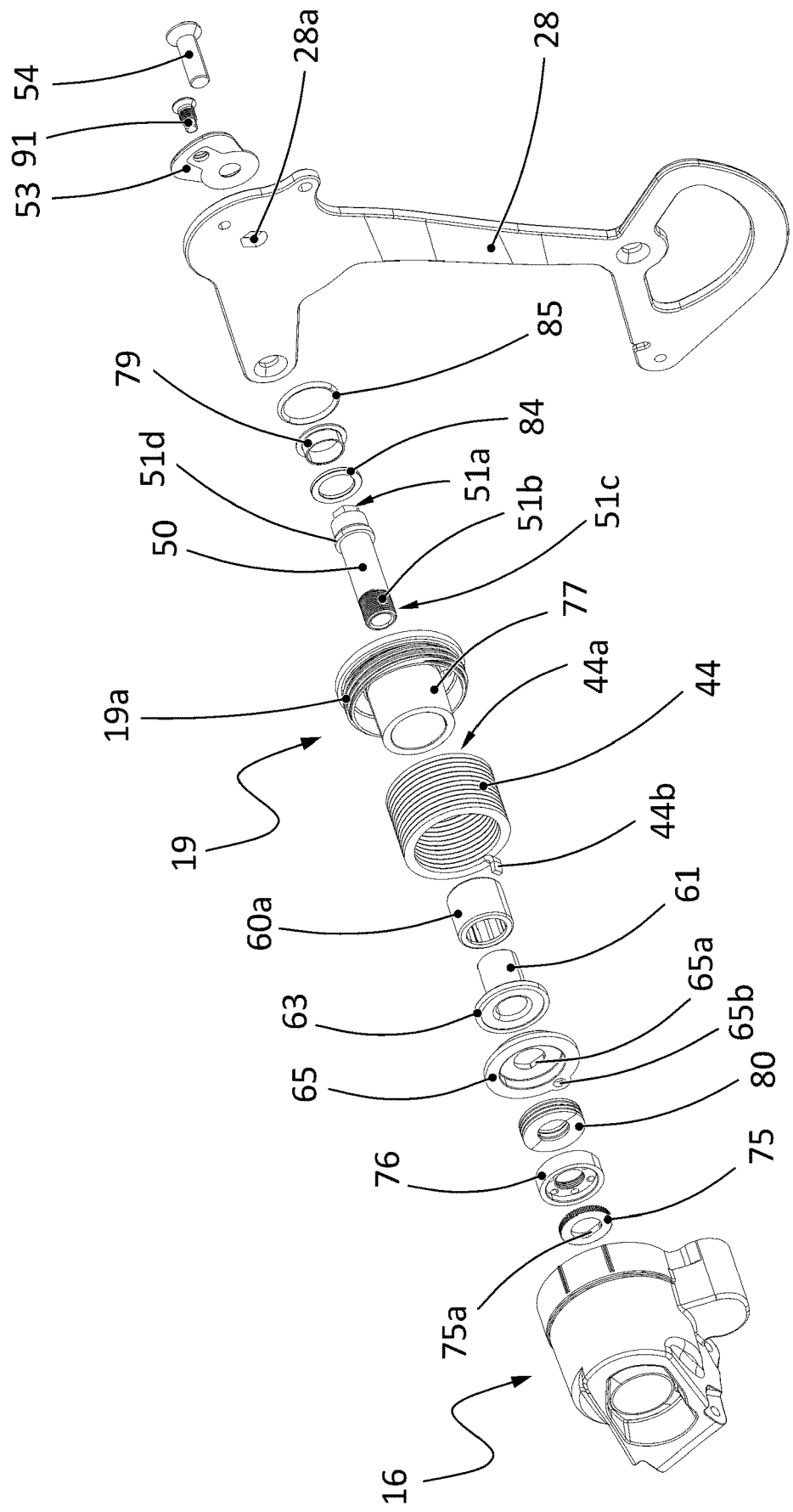
FIG. 5 shows an exploded view of the movable element (P knuckle) with components arranged therein and thereon, including the components of a spring-damper device of the first exemplary embodiment.

The chain guide assembly 25 is attached rotatably to the movable element 16 and is preloaded in a chain tensioning direction by a preload spring arrangement, in the present case in the form of a torsion spring 44 designed as a helical spring (cf. FIG. 3).

The derailleur 10 includes, in the movable element 16, a damper assembly 38 which dampens a rotational movement of the chain guide assembly 25 relative to the movable element 16 in a direction of rotation opposite to the chain tensioning direction. Here, the expression "damper assembly" refers to a device which can also be referred to as "opposing force generating device" and which, in the exemplary embodiment, includes a freewheel clutch device and a friction device and an elastic force store device which is assigned or belongs to the friction device. Consideration may be given to damping devices of an entirely different type. By the damping device 38, an opposing force which counteracts a rotation in a direction of rotation (second direction of rotation) opposite to the chain tensioning direction (first direction of rotation) relative to the movable element, and which acts as damping force, can be exerted on the chain guide assembly.

A forward direction V (cf. FIG. 1) corresponds to the forward direction of a bicycle which has a derailleur system with the derailleur. A pivoting direction of the chain guide assembly 25 with a movement component opposite to the forward direction V in which the guided chain is tensioned is denoted by S in FIG. 2. The pivoting direction opposite to this chain tensioning direction S, with a movement component in the forward direction V, is denoted by L in FIG. 2. A pivoting of the chain guide assembly 25 in said pivoting direction L can result in an undesired reduction of the chain tension, possibly with the risk that the chain, which has been loosened in this way, could jump off the pinion assembly.

FIG. 3 shows how the (outer) cage plate 28 of the chain guide 26 is connected rotationally conjointly to a rotary shaft 50, which is mounted rotatably in the movable element 16 in a receptacle 17. A rotationally asymmetrical coupling portion 51a, in the present case of polygonal form, of the rotary shaft engages into a complementarily shaped coupling opening 28a of the cage plate 28, such that the rotary shaft 50 is connected rotationally conjointly to the cage plate. An axial screw 54 which engages through an opening of a washer 53 is screwed into an axial screw opening of the coupling portion 51a in order to fixedly connect the cage plate 28 to the rotary shaft 50, which is preferably of hollow form over its entire length.

The damper assembly or damping device 38 includes a coupling device in the form of a one-way or freewheel clutch, specifically in the form of a roller-type clutch 60 of conventional type of construction, with an inner clutch element 61 and an outer clutch element 60a and roller elements 60b which acts between these. The inner clutch element is, in the present case, formed by a running bushing 61 arranged rotatably on the rotary shaft 50. The running bushing has, at an end portion averted from the cage plate 28, a friction flange 63 which provides an axially directed friction surface and which, together with a friction portion of an axially adjacent element 65, belongs to a friction device 70. For this purpose, the element 65, which also serves for the coupling of the preload spring 44, designed as a torsion spring, to the rotary shaft 50 and which will therefore be referred to below as coupling member 65, has, at its friction portion, a counterpart friction surface which engages in frictionally locking fashion with the annular friction surface of the friction flange 63.

The frictionally locking engagement of the two friction surfaces is determined by the preload force of a disc spring assembly 80, which is braced between the coupling member 65, which is in principle arranged in axially movable fashion on the rotary shaft 50, and a setting element 76 which is screwed onto an inner end portion 51b, which has an external thread, of the rotary shaft 50. The setting element 76 is, during the production process, screwed into a setpoint position which gives rise to a desired preload, in order to set a desired friction moment and thus a desired damping force, and said setting element is then preferably secured in this setpoint position, for example by caulking with a securing member 75 arranged rotationally conjointly on the rotary shaft. In the present case, the securing member is received in a cutout of the setting element 76 and is, at a knurling on the outer circumference, caulked with an inner circumference of the cutout. The annular securing member 75 engages, at a rotationally asymmetrical coupling formation 75a, in this case a flattened portion, on its inner circumference, with a complementary counterpart coupling formation, in this case a flattened portion 51c, at the end portion 51b, of the rotary shaft 50, such that the securing member is seated rotationally conjointly on the rotary shaft and thus secures the setting element 76 against rotation.

The coupling member 65 is arranged rotationally fixed onto the rotary shaft 50. For this purpose, the coupling member 65 engages at a rotationally asymmetrical coupling formation, in this case a flattened portion 65a on its inner circumference, with a complementary counterpart coupling formation, in this case the flattened portion 51c on the rotary shaft 50. Thus, the damper assembly 38 can exert a damping force on the cage plate 28, and thus the chain guide assembly 25 as a whole, via the rotary shaft 50.

The roller-type clutch 60 is, at the outer clutch element 60a, held rotationally fixedly, for example with an interference fit, in a sleeve-shaped holder 77 which is static in relation to the movable element 16, and said roller-type clutch is thus indirectly supported against rotation on the movable element (P knuckle) 16. The holder 77 is, in the present case, formed by a portion, which projects axially into a receptacle 17 of the movable element 16, of a cover element 19 which closes the receptacle in the direction of the cage plate 28 and which is directly adjacent thereto. The cover element 19, which is for example produced from plastic and which can also be referred to as cover or housing cover, may be of multi-part form, but is in the present case, and preferably, of single-part form. The cover element 19 may be fixed in positively locking, frictionally locking or cohesive fashion to the movable element 16. In the present case, a positively locking screw connection by preferably multi-start thread formations 19a and 16a on an outer circumference of the cover element 19 and an inner circumference of the movable element (P knuckle) 16 is realized in an outer end region of the receptacle 17.

As mentioned, the clutch element 60a and thus the roller-type clutch 60 as a whole is held rotationally fixedly in the holder 77 of the cover element 19. Instead of an interference fit, consideration may also be given to positively locking coupling to the holder 77.

Figure 6:
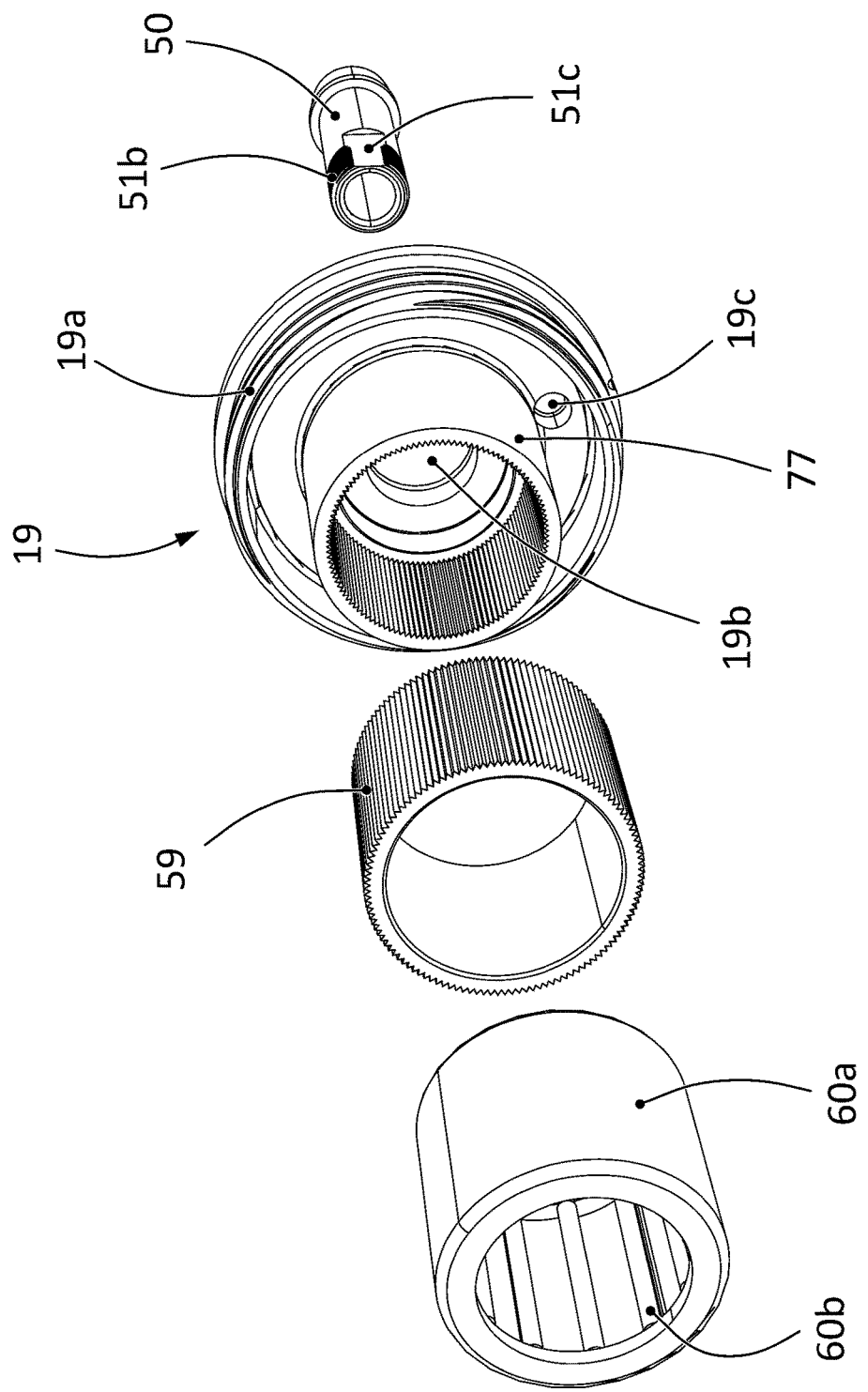
FIG. 6 shows an exploded view of a freewheel clutch, of a support sleeve and of a housing cover together with a rotary shaft of the spring-damper device of the first exemplary embodiment.
Figure 7:
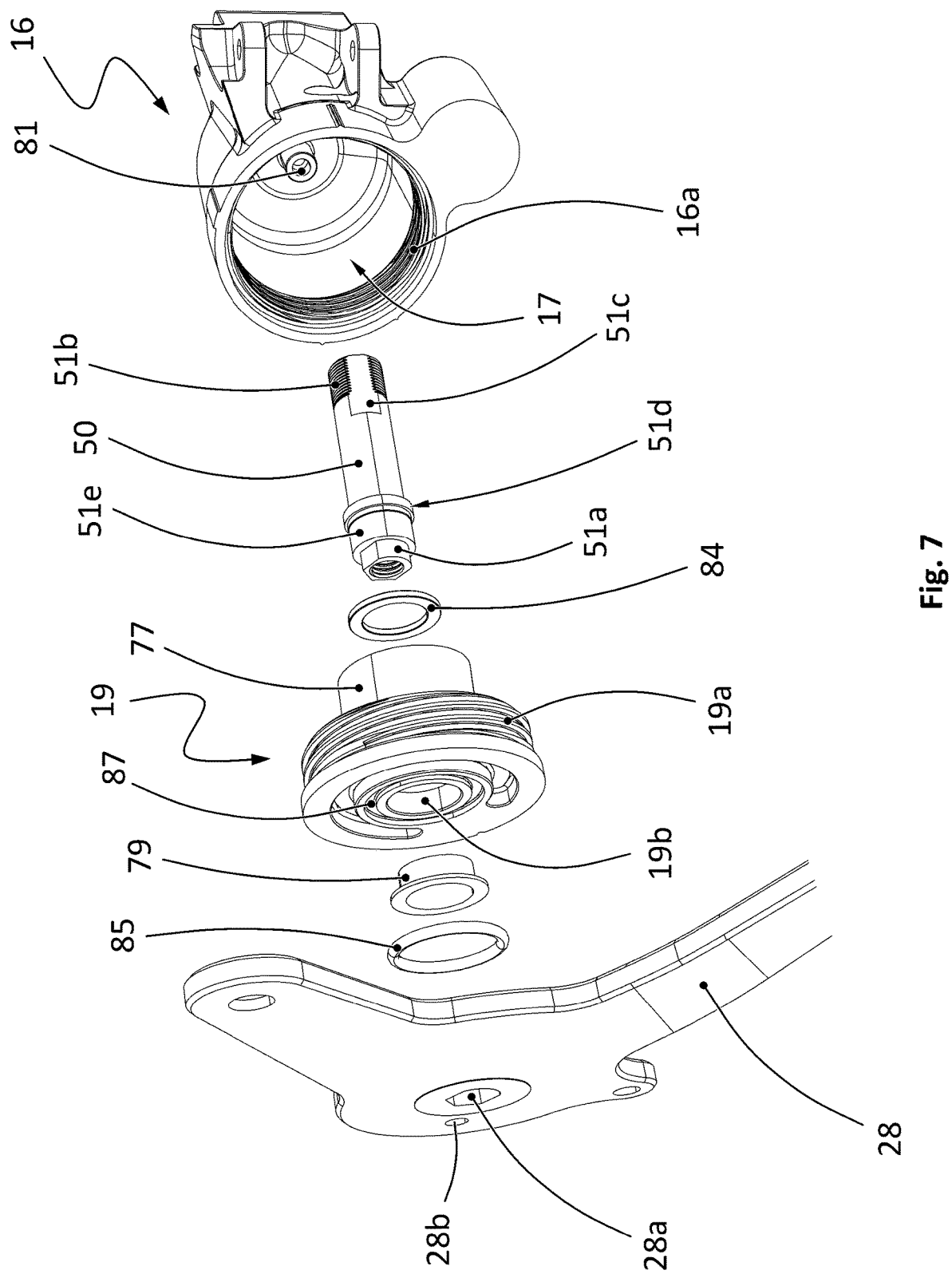
FIG. 7 shows an exploded view of the movable element (P knuckle) which serves as housing, of the housing cover, of the rotary shaft, of an outer cage plate of a chain guide assembly, and of further components of the first exemplary embodiment.

In a variant shown in FIG. 6, the outer clutch element 60a of the roller-type clutch 60 is pressed into, that is to say held with an interference fit in, a steel sleeve 59 which, on the outer circumference, has a holding formation for example in the form of a knurling, which engages in positively locking fashion with a counterpart holding formation, for example in the form of a knurling, on the inner circumference of the sleeve-shaped holder 77. It may also be provided that the steel sleeve 59 is pressed into the holder 77 or that the holder sleeve 77 is produced by overmoulding of the steel sleeve 59 during the production of the cover element 19 by an injection moulding process. It is pointed out that the cover element may also be produced from metal, for example from aluminium. In such a case, an additional reinforcement sleeve such as the steel sleeve 59 can generally be omitted.

The cover element 19 has an opening 19b into which a bearing portion 51e of the rotary shaft 50 engages, from which bearing portion the coupling portion 51a projects and engages into the coupling opening 28a of the cage plate 28. The bearing portion 51e forms, together with an inner circumference, which delimits the opening 19b, of the cover element 19, a rotary bearing for the rotary shaft, where a bearing bushing 79 preferably also acts between the bearing portion 50e and said inner circumference of the cover element 19 in order to form a low-friction plain bearing. This may make particular sense if the cover element 19 is produced from metal, for example aluminium. If the cover element 19 is produced from plastic, such a bearing bushing can generally be omitted.

A further rotary bearing for the rotary shaft 50 is formed by a journal 81, which is in one piece with the movable element 16 and which projects axially into the receptacle 17 from a wall portion situated opposite the cover element 19, and by that end portion 51b of the rotary shaft 50 which serves as bearing sleeve, into which the journal 81 engages. An additional bearing bushing may be provided in order to realize a low-friction plain bearing. This may make particular sense if the cover element 19 is produced from metal, for example aluminium.

The two plain bearings thus formed have a very large or even maximal spacing in relation to the axial dimension of the movable element 16, which ensures a defined rotary mounting of the rotary shaft 50 and of the components coupled thereto. The rotary shaft is thus, at one side, mounted by the journal 81 directly on the body, produced from plastic or metal, for example aluminium, of the movable element 16 and, at the other side, mounted indirectly on the movable element 16 by the cover element 19. The rotational mounting of the cover is however preferably such, for example has a suitable axial extent or/and diameter step in the region of the rotary shaft, for example by the annular collar 51d and the spacer disc 84, that the rotary shaft 50 is also held in a defined position, extending axially from the cover element into the receptacle 17, exclusively by this rotational mounting at the cover side, such that the cover element can form a preassembled structural unit with the rotary shaft, the outer cage plate 28 and further components, which structural unit can then be combined with the movable element 16, which forms a type of housing.

The roller-type clutch 60 is configured such that that direction of rotation of the rotary shaft 50 which corresponds to the chain tensioning direction S is the freewheel direction of rotation of the roller-type clutch, in which the inner clutch element 61 can rotate unhindered relative to the outer clutch element 60a. The inner clutch element 61, which is coupled in frictionally locking fashion to the rotary shaft 50 via the friction device 70, can thus co-rotate with the rotary shaft in the chain tensioning direction S without damping forces which counteract this rotation being exerted by the damping device 38. The chain guide assembly 25 can thus rotate freely in this direction of rotation.

By contrast, the pivoting direction L which is opposite to the chain tensioning direction S corresponds to the blocking direction of the roller-type clutch 60, in which a rotation of the inner clutch element 61 relative to the outer clutch element 60a of the roller-type clutch is blocked. Thus, in this direction, the rotary shaft 50 and thus the chain guide assembly 25 can rotate only with corresponding relative rotation of the coupling member 65, which is held rotationally conjointly on the rotary shaft 50, with respect to the inner clutch element 61, which remain static, of the roller-type clutch 60, such that the friction surfaces, which are in frictional engagement with one another, of the friction device 70 rotate relative to one another and, via the coupling member 65, an opposing force which counteracts this rotation is exerted on the rotary shaft 50 and thus on the chain guide assembly 25, the damping force of the damping device 38.

The roller-type clutch 60 may advantageously be formed by a sleeve-type freewheel, a sleeve-like element 60*a*, on the inner circumference of which the roller elements 60*b* are held and which is combined with the running bushing 61, which serves as inner clutch element.

In the conventional solutions according to DE 10 2014 025 036 A1/U.S. Pat. No. 9,463,846 B2, the force store device which preloads the chain guide assembly 25 in the pivoting direction S, in this case a helical torsion spring, is at one side supported in positively locking fashion directly on the body of the movable element (P knuckle) and is at the other side coupled directly to the outer cage plate of the chain guide assembly, or to an intermediate disc connected rotationally conjointly thereto, in order to directly exert the preload force on the chain guide assembly. In the exemplary embodiment illustrated, it is the case, by contrast, that the force store device in the form of the torsion spring 44 is at one side supported with one spring end 44*a* in an outwardly closed depression 19*c* of the cover element 19, and engages at its other spring end 44*b* into an opening 65*b* of the coupling member 65 in order to transmit its preload force via the coupling member 65, which is seated rotationally conjointly on the rotary shaft 50, and the rotary shaft 50 to the outer cage plate 28 and thus to the chain guide assembly.

Figure 8:
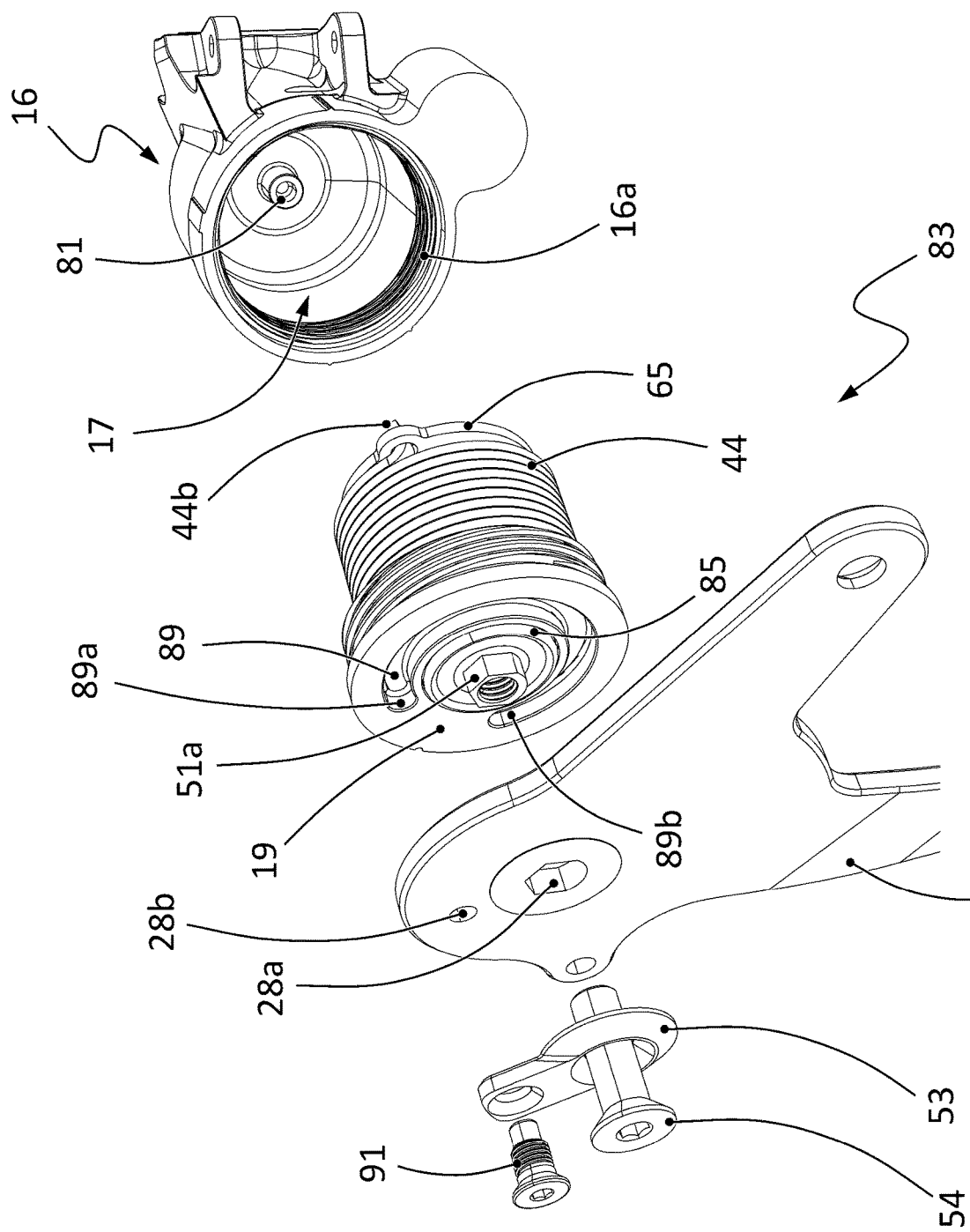
FIG. 8 shows an exploded view of the housing, of a structural unit formed by the cover, the rotary shaft and the components of the spring-damper device, of the outer cage plate and of further components of the first exemplary embodiment.
Figure 9:
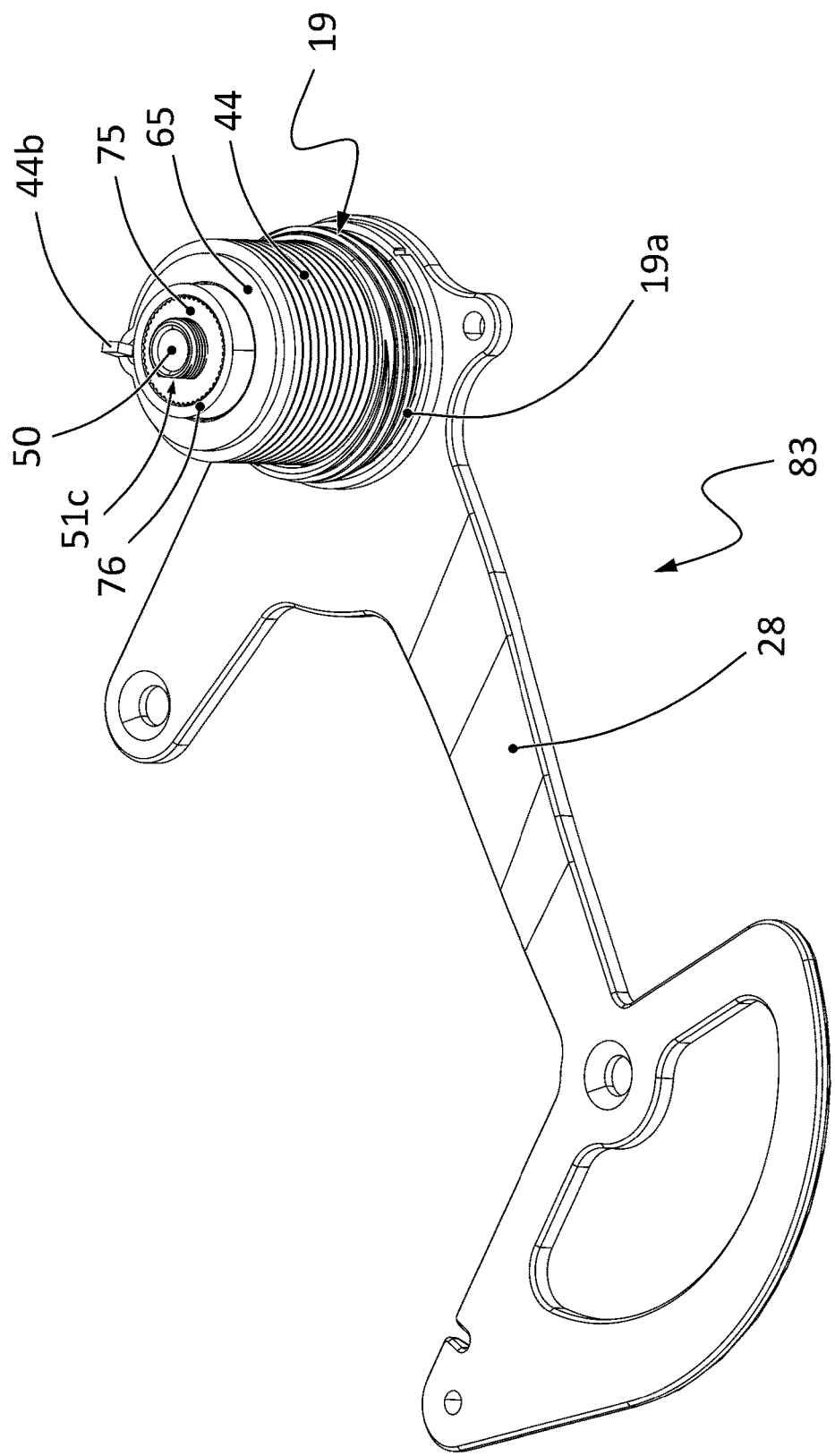
FIG. 9 shows the cage plate and the structural unit of FIG. 8 in a state in which they have been assembled to form a superordinate structural unit.

The torsion spring 44 can thus form a structural unit with the cover element 19, the coupling member 65, the force store device which is braced between the coupling member 65 and the setting element 76 and which is in the form of the disc spring arrangement 80, the screw securing means 75 and the roller-type freewheel 60, including the damper running bushing 61 and a few further components to be mentioned below, which structural unit can be preassembled outside the receptacle 17 of the movable element 16, as can be seen in FIG. 8. The outer cage plate 28, which is to be mounted rotationally conjointly on the rotary shaft, may also belong to this structural unit 83, as illustrated in FIG. 9. It is thus also possible for the entire chain guide assembly 25 to belong to this structural unit 83 if desired. The formation of these components as a modular subassembly is a major advantage of the described embodiment, because the assembly process is greatly facilitated.

This subassembly or structural unit can be adjusted with regard to the preload of the elastic force store device of the friction device, in this case of the disc spring assembly 80, outside the receptacle 17 of the movable element (P knuckle) 16 by the preload nut 76, and this setpoint setting can then be secured by the screw securing means 75 or in some other way.

Likewise, the elastic force store device assigned to the chain guide assembly 25, in this case the torsion spring 44, can be adjusted with regard to its preload outside the receptacle 17, during the course of the assembly of said structural unit 83, for example by utilizing a rotational stop 89*a* which is provided between the cage plate 28 and the cover element 19 and which defines a type of zero position for the chain guide assembly 25, as will be described in more detail below.

Subsequently, said structural unit can then be combined with the movable element 16 by virtue of the cover element 19 being screwed with its external thread 19*a* into the internal thread 16*a* of the movable element 16, with that end portion 51*b* of the rotary shaft 50 which serves as plain bearing sleeve being pushed onto the bearing journal 81 of the movable element. The inner circumference of this end section 51*b*, which serves as a bearing sleeve, and the outer circumference of the bearing journal 81 then form plain bearing surfaces of the plain bearing thus formed.

In the case of the described construction, the axial preload forces exerted by the disc assembly are, without the participation of the movable element 16, supported on the rotary shaft 50 firstly by the preload nut 76 and secondly by the coupling member 65 and the running bushing 61. For the support via the running bushing 61, the rotary shaft has a radially projecting annular collar 51*d*, on which the running bushing 61 engages by way of an annular end surface. An axial annular surface of the annular collar and the axial end surface of the running bushing 61 form a further pair of friction surfaces, which belong to the friction device 70 of the damping device 38. Instead of axially directed annular surfaces on the end of the running bushing 61 and on the annular collar, it is also possible for friction surfaces which run obliquely in cross section to be provided in order, firstly, to enlarge the surface areas of the friction surfaces and, secondly, provide a centring function.

According to the above, the preload force of the disc spring assembly 80 is supported on the rotary shaft 50 via a support arrangement, which includes the friction surfaces of the friction device and includes the coupling member 65 and the running bushing 61. The radially outer clutch element 60*a* of the roller-type clutch 60 is in this case not subjected to axial forces. Here, it is also the case that no axial forces are exerted on the cover element 19.

At its other axial side, the annular collar 51*d* of the rotary shaft 50 serves for support on a radially inwardly directed flange portion of the cover element 19, which flange portion delimits the passage and bearing opening 19*b*. This support may be realized via a spacer disc 84, as illustrated in the figures. A fastening force realized as a result of tightening of the axle screw 54 is supported, for which purpose the stated components, including the bearing bushing 79 and the cage plate 28 with the washer 53, are dimensioned axially in a manner coordinated with one another.

For the sealing of the interior space or of the receptacle 17 of the movable element (P knuckle), at least one O-ring or the like is preferably arranged between the cage plate 28 and the cover element 19 or/and between the cover element 19 and the rotary shaft 50. In the present case, an O-ring 85 is received in an associated annular groove 87 of the cover element 19. At least one O-ring or the like may also be arranged between the cover element 19 and the movable element 16, for example between a flange portion of the cover element 19 adjacent to the external thread 19*a* and an annular step on the inner circumference of the movable element 16 adjacent to the internal thread 16*a*. The threaded engagement between the cover element and the movable element may however suffice on its own for sufficient sealing of the interior space of the movable element (P knuckle), in particular if the cover element is formed as a plastics part.

It is to be noted that it would also be possible to omit the spacer disc 84 and the bearing bushing 79. The bearing bushing 79 can be omitted in particular if the cover element is produced from plastic. In the case of the cover element being composed of metal, in particular aluminium, a bearing bushing 79 or the like will however generally be expedient in order to form a plain bearing. The O-ring 85 could also be fitted between the rotary shaft and the cover element axially outside a plain bearing formed by the outer circumference of the rotary shaft 50 and the inner circumference of the cover element.

FIG. 3 shows the force or torque flows of the torsion spring 44, which forms a first elastic force store device, and of the damping device 38 with regard to the preload force or damping force exerted by the rotary shaft 50. A first arrow line T shows the force flow proceeding from the torsion spring 44, which can also be referred to as cage spring. The force flow runs from the torsion spring 44 via the coupling member 65 to the rotary shaft 50, and from the latter to the cage plate 28. The torsion spring 44 supports the opposing force corresponding to said preload force on the movable element (P knuckle) via the cover element 19, by the threaded arrangement 16a, 19a. It may favourably be provided that said opposing force acts in the direction of a tightening of the threaded engagement between the external thread 19a of the cover element 19 and the internal thread 16a of the movable element 16. Said threaded engagement is thus not loosened, but rather is tightened or held in the tightened state, by the acting opposing force in relation to the preload force exerted on the chain guide assembly 25.

Owing to the connection of the torsion spring 44 axially at the inside to the rotary shaft 50 by the coupling member 65 and axially at the outside to the movable element 16 by the cover element 19, the torsion spring 44 is wound with a winding direction opposite to that in the known solutions of DE 10 2014 225 036 A1/U.S. Pat. No. 9,463,846 B2. Owing to the static support at the left-hand spring end 44a and the connection of the right-hand spring end 44b to the chain guide assembly via the rotary shaft 50, the torsion spring 44 is designed as a torsion spring with left-handed winding, whereas, in the discussed references, a torsion spring with right-handed winding is used, which is supported in a static manner at the right-hand spring end and is coupled at the left-hand spring end to the chain guide assembly.

By contrast, a second arrow line D shows the force flow proceeding from the damping device 38, specifically firstly the damping force exerted on the cage plate 28, which arises only in the event of a rotation of the cage plate 28 counter to the chain tensioning direction. Then, a relative rotation occurs between the friction surfaces of the friction device 70, specifically the axial annular friction surface on the friction flange 63 of the running bushing 61 and the associated friction surface on the coupling member 65. As illustrated, the roller-type clutch 60 assumes a blocked state, such that the running bushing 61 is held fixedly in its present rotational position relative to the cover element 19, and thus relative to the movable element (P knuckle) 16, by the roller-type clutch 60. The coupling member 65 held rotationally conjointly on the rotary shaft 50 can thus rotate only counter to a damping force arising as a result of the frictional engagement of the friction surfaces of the friction device, which damping force is thus exerted by the coupling member 65 on the cage plate 28 via the rotary shaft 50. Secondly, the opposing force, which corresponds to said damping force, from the running bushing 61 is supported on the cover-side holder 77 via the rollers 60b and the outer clutch element 60a of the roller-type clutch 60, by the steel sleeve 59 in the case of the design variant of FIG. 6. The cover element then supports said opposing force in relation to the damping force on the movable element (P knuckle) 16 via the thread arrangement 16a, 19a.

The disc spring arrangement 80, which forms a second elastic force store device, of the friction device 70 exerts only axial forces, which are supported firstly on the rotary shaft 50 via the setting element 76 and secondly on the annular collar 51d of the rotary shaft 50 via the support arrangement which includes the friction surfaces of the friction device. Said support arrangement is formed, in the exemplary embodiment shown, by the coupling member 65 and the running bushing 61.

It is advantageously possible for a rotational stop to be provided for the pivoting range of the outer cage plate 28 relative to the cover element 19 and thus the movable element 16. In the exemplary embodiment shown (cf. FIGS. 3, 7 and 8), said rotational stop is of concealed form and is formed by a circular-segment-shaped receiving groove 89, which surrounds the receiving groove 87 for the O-ring 85 radially at the outside, in the outer end surface, facing towards the cage plate 28, of the cover element 19. An end portion, which forms a rotational stop, of a stop screw 91 engages into said receiving groove, which stop screw is screwed through an associated opening of the washer 53 into a screw-in opening 28b, which has an internal thread, of the cage plate 28.

One end 89a of the receiving groove 89 forms a first rotational end stop for the cage plate 28 and thus the chain guide assembly. If the stop screw 91 abuts with its end portion received in the receiving groove 89 against said end stop 89a, then the chain guide assembly is in a type of zero position. The chain guide assembly assumes the zero position when no chain is held tensioned by the chain guide assembly. By this stop, the external thread 19a and the internal thread 16a can be rotated relative to one another by rotation of the chain guide assembly 25 or of the outer cage plate 28 in a loosening direction. The cover element 19 can thus be easily unscrewed from the movable element (P knuckle) 16.

By contrast, the other end 89b of the receiving groove 89 forms an end stop which prevents an over-rotation of the torsion spring 44. Thus, the chain guide assembly 25 can be rotated only to a limited extent in the pivoting direction L which is opposite to the chain tensioning direction S. This rotational end stop 89b can moreover be used, by the chain guide assembly 25 or the outer cage plate 28, for the cover element 19 to be screwed into the receptacle 17 of the movable element (P knuckle) 16 and tightened. The assembly process is thus greatly facilitated.

Further details of the derailleur according to the first exemplary embodiment will emerge directly to a person skilled in the art from the associated figures.

With regard to the exemplary embodiment, it is also to be noted that both axial and radial compactness are made possible for the movable element 16.

With regard to the axial compactness, it is to be noted that the movable element (P knuckle) 16 is of axially much more compact design than in the known embodiments of DE 10 2014 225 036 A1/U.S. Pat. No. 9,463,846 B2. This is contributed to in particular by the fact that the damping device 38 arranged radially within the torsion spring 44, including its roller-type coupling 60, the friction device 70 and the associated disc spring assembly 80, is arranged in the axial region of extent of the torsion spring 44. In this regard, reference is made to FIG. 3. This axial compactness is a major advantage of the embodiment according to the disclosure.

Further major advantages of the embodiment according to the disclosure are the favourable mounting of the rotary shaft 50 on the housing cover, that is to say the cover element 19, in conjunction with the relatively large bearing spacing arising from the mounting axially at the inside on the movable element, the coupling of the torsion spring 44 to the chain guide assembly via the rotary shaft 50, and the support of the axial pressure forces, exerted by the disc spring arrangement 80, on the rotary shaft 50 without participation of the movable element 16. Also, the rotational forces exerted by the helical torsion spring 44 are exerted and supported without participation of the movable element 16, such that the described spring-damper structural unit 83 can comprise these two elastic force store devices 44 and 80 in their respective stressed state.

A further major advantage arises from the modular construction and the possibility of the provision of an independently handlable and assemblable spring-damper module which is adjustable with regard to the preload force, which influences the frictional engagement of the friction device, of the disc spring arrangement, on which spring-damper module the outer cage plate 28 or even the entire chain guide assembly 25 can already be mounted. Then, after assembly and completion of adjustment, said spring-damper module is, or the corresponding structural unit can be, easily combined with the movable element 16 by insertion into the receptacle 17 and positively locking, frictionally locking or cohesive connection, for example screw connection, to the movable element 16 which forms a type of housing for the structural unit, where the cover element 19 forms the associated housing cover.

Further advantages result from the fact that the interior space of said housing can be reliably sealed off with little outlay, such that a type of hermetically sealed machine housing for those components of the structural unit which are received in the receptacle is created, whereby corrosion problems and the ingress of dirt are avoided. This makes a major contribution to ensuring defined characteristics of the chain tensioning function and of the damping function, and precise rotational mounting of the chain guide assembly, over a long service life.

It is to be noted that these advantages are independent of the construction and the configuration of the damping device, such that consideration may also be given to damping devices of different types. Many of these advantages are also entirely independent of whether or not the rear derailleur is formed with a damping device in the movable element (P knuckle). Proceeding from the presented exemplary embodiment, a person skilled in the art can readily provide a structurally simplified embodiment without a damping device, in the case of which the torsion spring is analogously coupled to the chain guide assembly via the rotary shaft, the rotary shaft is mounted on the movable element by a housing cover, and these components are preassemblable as an assembly or spring module in order to then be combined in the described manner with the body of the movable element, so as to permit simple and reliable sealing. In the exemplary embodiment, it is in fact the case that only a single O-ring, specifically the O-ring 85, is used to reliably seal off the interior space of the movable element 16 to the outside.

A second exemplary embodiment for a bicycle derailleur according to the disclosure, which includes a damper assembly substantially corresponding to the first design approach, is shown in various views in FIGS. 11 to 16. Only the movable element (P knuckle) 16, with the components arranged thereon or therein and with the outer cage plate 28, is illustrated. In the following description of the second exemplary embodiment, the same reference designations as used above for the first exemplary embodiment are used for analogous and identical elements, and only the differences in relation to the first exemplary embodiment will be discussed. Certain structural modifications of the second exemplary embodiment in relation to the first exemplary embodiment may readily emerge from the figures and in fact require no further explanation.

The most important difference in relation to the first exemplary embodiment lies in the fact that the coupling member 65, which can also be referred to as spring flange and which serves for the coupling of the helical torsion spring 44 to the rotary shaft 50 in order to exert the preload force on the chain guide assembly via the rotary shaft, in the second exemplary embodiment does not belong to the friction device, aside from participation in axially supporting the disc spring arrangement 80. The coupling member 65 thus does not perform a dual function in the manner of the coupling member 65 of the first exemplary embodiment. Instead, an additional friction disc 99 is provided, which is arranged rotationally conjointly but axially movably on the rotary shaft 50 and which engages in frictionally locking fashion with the friction flange 63 of the running bushing 61. With regard to the implementation of the friction device 70, the friction disc 99 thus replaces the coupling member 65 of the first exemplary embodiment. The elastic force store device 80, implemented as a disc spring arrangement, of the friction device 70 is clamped between the coupling member 65, which is supported axially on the setting element 76, and the friction disc 99.

As in the first exemplary embodiment, the setting element 76 serves for the setting of the preload force of the disc spring arrangement 80 and thus of the frictional engagement between the friction disc 99 and the friction flange 63 and thus of the damping force exerted on the chain guide assembly via the rotary shaft 50. As can be seen in FIGS. 10 and 13, the disc spring arrangement is arranged on a centring element 101 situated radially at the inside. The rotary shaft 50 is, at its axially inner end region, formed with flattened portions 51*c* on opposite sides, which flattened portions serve for the rotational coupling to the coupling member 65 and to the friction disc 99, which are of complementary design at their inner circumference. It is also possible for a screw securing means to be provided for the setting element 76, for example by way of adhesive bonding or in some other form, if this is desired for example for impeding a manipulation by a user. A separate screw securing means is technically not imperatively necessary, because the setting element 76 can be tightened against the coupling member 65 which is rotationally fixed with respect to the rotary shaft 50, thus yielding a sufficient securing action against inadvertent adjustment.

The helical torsion spring 44 is, at its right-hand, axially inner end 44*b* in FIGS. 10 and 13, received in a coupling cutout 65*b*, formed as a radial slot, of the coupling member 65. At its left-hand, axially outer end 44*a* in FIGS. 10 and 13, the torsion spring 44 engages into a coupling cutout 19*c* of the cover element 19, which is referred to here primarily as housing cover. Said coupling cutout could, as in the first exemplary embodiment, be of non-continuous form, and therefore may be closed to the outside. In the exemplary embodiment illustrated, however, said coupling cutout 19*c* is of continuous form, and the left-hand spring end 44*a* projects beyond a front side of the housing cover 19. For the purposes of sealing, a sealing cap 103 is received in the coupling cutout 19*c*, into which sealing cap the axially outer spring end 44*a* engages. The sealing cap 103 may be an element which is separate from the housing cover 19 and which is inserted from the inside into the coupling cutout 19*c* and which, by way of a radially projecting flange, engages in positively locking fashion with a portion, which delimits the coupling cutout 19*c*, of the housing cover 19 such that the sealing cap 103 cannot be pulled off outward. Sealing engagement between the sealing cap 103 and the housing cover 19 is ensured. Adhesive bonding of the sealing cap 103 to the housing cover 19 may also be considered. It would furthermore also be possible for the sealing cap 103 to be formed in one piece with the housing cover 19, in particular if the latter is produced in an injection moulding process or the like from plastic. By contrast, in the case of the housing cover 19 being produced from metal, a separate form of the sealing cap 103 is preferred.

As illustrated in FIGS. 14 and 15, in particular in FIG. 15, the sealing cap 103 performs an additional function. Specifically, the sealing cap serves as an open rotational stop between the chain cage and the housing cover 19 and thus the movable element (P knuckle) 16. For this purpose, the outer cage plate 28 has two cage stops 89a and 89b. The cage stop 89a abuts against the sealing cap 103 when the chain guide assembly is situated in its zero position. By said stop, the housing cover 19 can be unscrewed from the internal thread of the "housing" in the form of the movable element (P knuckle) 16. The cage stop 89b is an end stop for the cage, which prevents an over-rotation of the torsion spring 44 and enables the housing cover 19 to be easily screwed into the internal thread of the movable element (P knuckle) 16.

It is also possible for some other form of cover projecting length to be provided as cover-side stop element instead of the described sealing cap 103. There thus does not need to be any relationship with the coupling of the torsion spring to the cover element 19 and the sealing of the interior space of the movable element 16. A projecting formation of the movable element 16 may also be considered as a rotational stop.

M the exemplary embodiment shown, the roller-type freewheel 60, for which the running bushing 61 serves as inner clutch element, is received with a rotational interference fit in the holder 77 that is in one piece with the housing cover 19. The holder 77 is, by contrast to the first exemplary embodiment, formed as a sleeve portion, which is axially bevelled in cross section at the outer circumference, of the cover element 19.

As in the first exemplary embodiment, the pressure forces exerted by the disc spring arrangement 80 are supported firstly on the rotary shaft 50 via the coupling member 65 and the setting nut 76 and secondly on an annular collar 51d on the outer circumference of the rotary shaft 50 via the friction disc 99 and the running bushing 61.

An axially outer end surface of the running bushing 61 and an axially inner annular surface of the annular collar 51d form a further pair of frictionally engaging friction surfaces of the friction device 70. In the exemplary embodiment shown, said friction surfaces extend, in cross section, obliquely with respect to the axial and radial directions, for example at an angle of approximately 45 degrees. In this way, firstly, the effective surface area of said friction surfaces is enlarged, and secondly, a centring function with regard to the running bushing 61 relative to the rotary shaft 50 is attained. Referring to the force flow for the damping force as denoted by D in FIGS. 10 and 13, an additive force flow d illustrated by dotted lines in this figure arises here, as is inherently also the case in the first exemplary embodiment owing to the axially directed friction surfaces of the annular collar 51d and of the axially outer end of the running bushing 61. The friction surfaces formed by the friction disc 99 and by the friction flange 63 evidently have a considerably greater friction diameter than the bevelled friction surfaces, which give rise to the additive force flow, of the rotary shaft and of the running bushing 61.

For the rotationally conjoint coupling of the rotary shaft 50 to the chain guide assembly, the rotary shaft is formed with a toothed profile 105 at its end portion projecting out of the cover element 19. As can be seen in FIG. 13, the rotary shaft 50 projects beyond the housing cover 19 further than in the first exemplary embodiment, through a passage opening of the outer cage plate 28 as far as the inner cage plate 30, to which the outer end of the rotary shaft 50 is fixed by the screw 54. Here, the toothed profile 105 engages in positively locking fashion with a complementary holding formation of the inner cage plate 30 in order to realize rotationally conjoint coupling. Between the two cage plates, there is provided a cage bushing which acts as a spacer sleeve. A slipping seal in the form of an O-ring 85, which acts between the rotary shaft 50 and the housing cover 19, serves for sealing. As in the first exemplary embodiment, the cover element 19 is screwed to the movable element (P knuckle) 19 which serves as housing, preferably by multi-start external and internal threads 16a, 19a. Other types of connection of the cover 19 to the housing 16 may be considered, possibly likewise in positively locking or/and frictionally locking or/and cohesive form, for example by adhesive bonding.

As can be seen in FIG. 13, in the exemplary embodiment shown, an extremely short tolerance chain TK from the cage bushing 107, specifically from the surface 29 of the outer cage plate 28 which forms a locating surface for the guide roller 32 (cf. FIG. 14), to the movable element (P knuckle) 16 is realized. The rotary shaft 50 is, similarly to the first exemplary embodiment, mounted at one side on the housing cover 19 and at the other side, with a large axial spacing to the mounting on the cover side, by a bearing journal 81 which is in one piece with the movable element. The cover-side left-hand axle bearing in the form of a plain bearing acts as a centring fit 109 for the rotary shaft 50. A single seal, the O-ring 85 already discussed, seals the entire housing. The housing cover 19 is centred on the housing in the form of the movable element (P knuckle) 16 by a centring fit 112 which is defined by the outer diameter of the housing cover 19 and the inner diameter on the housing (movable element or P knuckle) 16. The cover element 19 is also held in an axially defined manner on the movable element (P knuckle) 16 by an axial stop 103 between the housing cover and the housing.

As is also the case in the first exemplary embodiment, the coupling member 65, which can be accurately referred to as spring flange, could be of multi-part design, for example of two-part design, which could possibly offer advantages in terms of production.

Figure 16A:
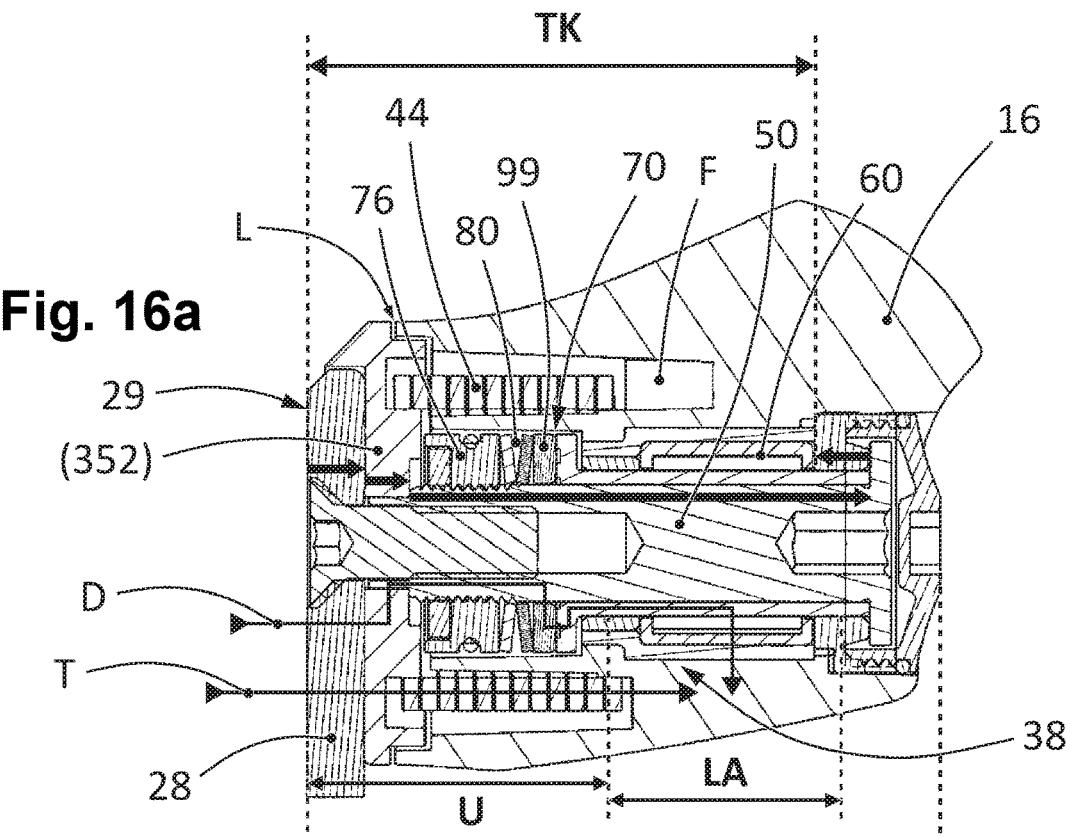
FIG. 16a shows a radial sectional view of a movable element (P knuckle) according to an embodiment.
Figure 16B:
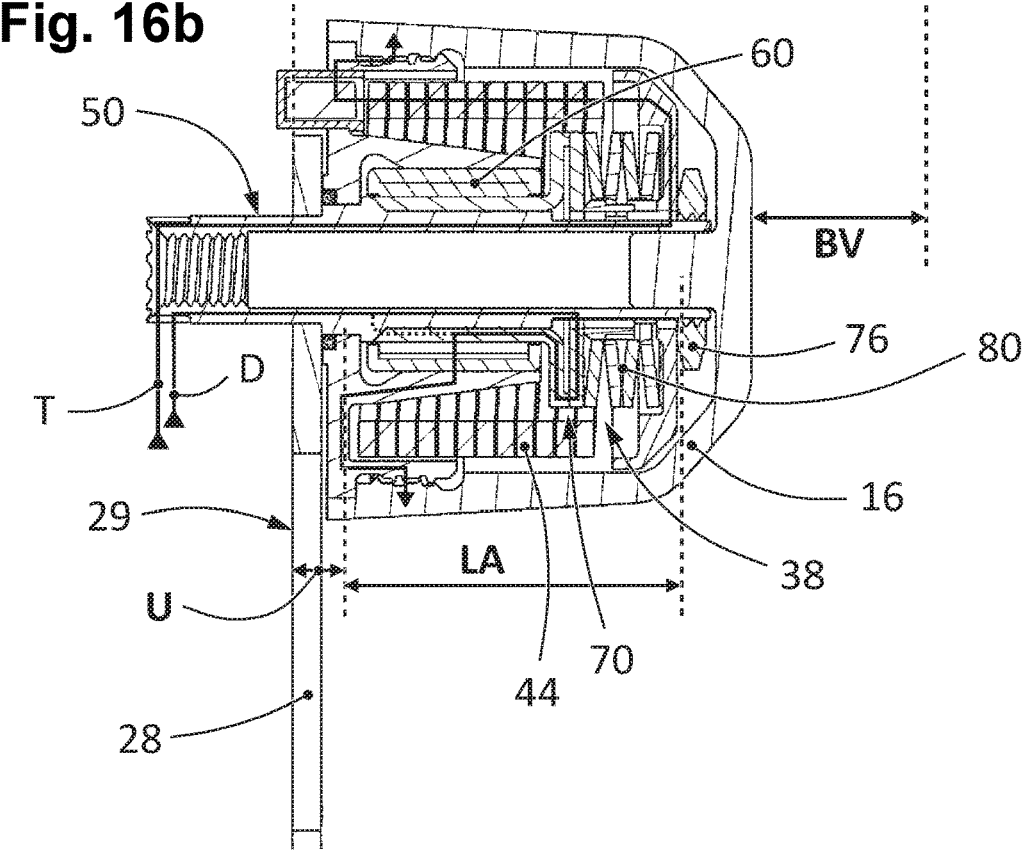
FIG. 16b shows a radial sectional view substantially corresponding to FIG. 13 of the movable element (P knuckle) of the second exemplary embodiment.
Figure 17:
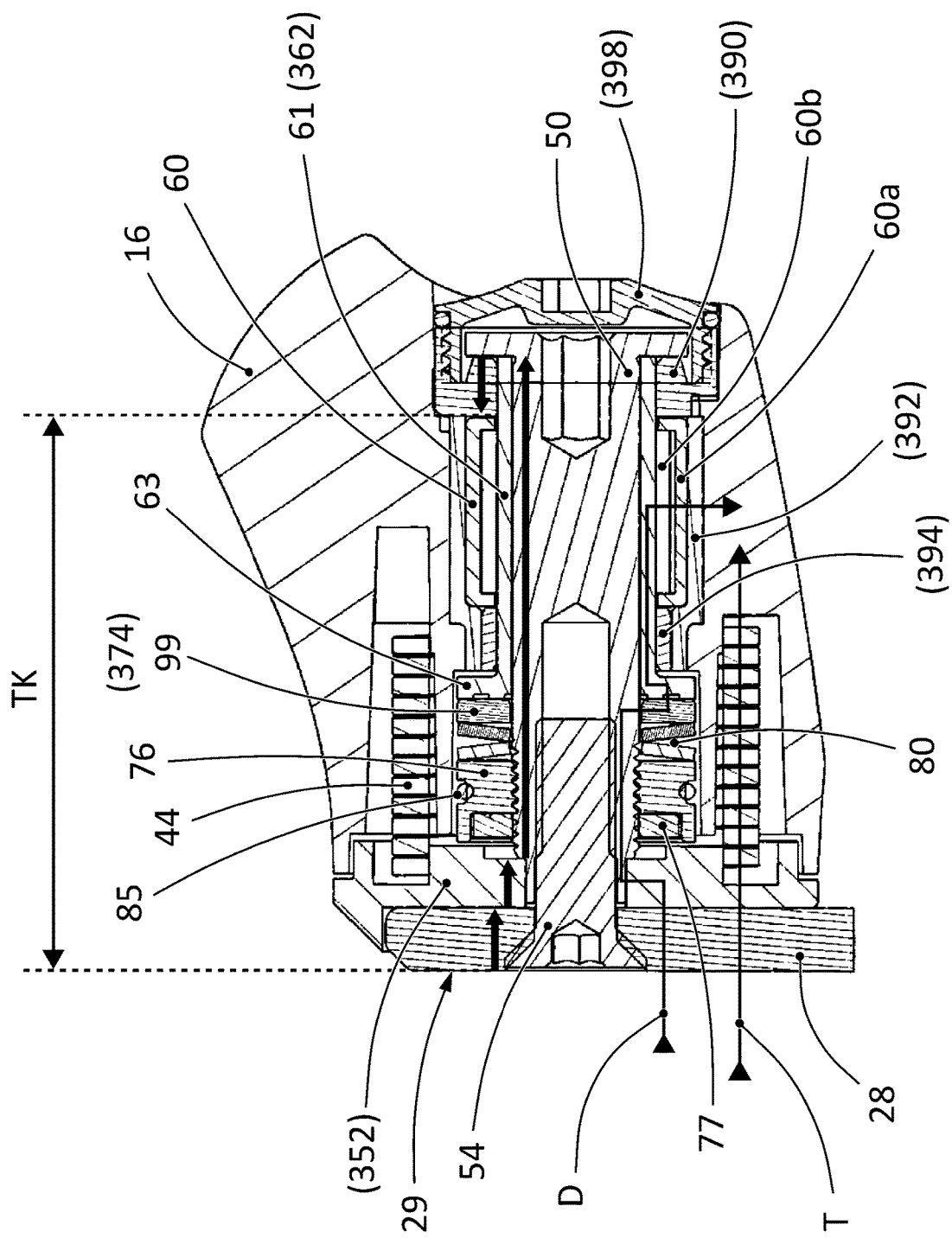

Practically relevant advantages of the embodiments according to the disclosure described herein in relation to known solutions, in particular the known solutions according to DE 10 2014 225 036 A1 and the corresponding U.S. Pat. No. 9,463,846 B2 will become readily apparent from FIGS. 16 and 17, which compare the embodiment of the second exemplary embodiment (cf. FIG. 16b) with the known solution according to FIG. 15 of DE 10 2014 225 036 A1/U.S. Pat. No. 9,463,846 B2 (cf. FIG. 16a and FIG. 17). In FIG. 16a and FIG. 17, the same reference designations are used for elements which correspond in a certain sense to elements of the exemplary embodiment according to the disclosure, and, for some elements, reference designations from FIGS. 15 to 17 and the associated description of the fourth exemplary embodiment of DE 10 2014 225 036 A1/U.S. Pat. No. 9,463,846 B2 are used between parentheses. Reference is expressly made to the description of this known solution in the cited documents, which, with the associated FIGS. 15 to 17 and the entirety of the rest of the content of DE 10 2014 225 036 A1/U.S. Pat. No. 9,463,846

B2, are fully incorporated by reference into the present description. The entire content of DE 10 2014 225 036 A1/U.S. Pat. No. 9,463,846 B2 thus belongs to the disclosure of this description.

As can be seen in FIG. 16a, the helical torsion spring 44 of the known solution is at one side in positively locking engagement with a moulded element F of the movable element 16 and is in engagement at the other side with an intermediate disc (352), which can be referred to as "P washer" and via which the torsion spring 44, received in an annular second receptacle, is coupled to the outer cage plate 28 of the chain guide assembly in order to transmit the preload of the torsion spring 44 to the chain guide assembly. The torsion spring is not sealed off with respect to the outer side. There is thus even an airgap L between the movable element (P knuckle) 16 and the intermediate disc 352. The friction device 70 is formed by a friction disc 99 and a friction flange of a running bushing 61 (352) surrounding the rotary shaft 50.

Via the running bushing 61 (362), the rotary shaft 50 is mounted by the rotary bearings (390) and (394) on a sleeve-like insert (392), which is held rotationally conjointly in the body of the movable element 16, or directly on the body of the movable element (P knuckle). As can be seen in FIG. 16A of the cited documents, the insert (392) is an element which is formed as a hexagon on the outer circumference and which is embedded into the movable element 16. The axial spacing LA of the bearing arrangement formed by these two bearings (390) and (394) is considerably smaller than the bearing spacing LA in the case of the embodiment according to the disclosure. In the known embodiment, only a small part of the axial structural space is utilized for this bearing arrangement, such that a greater axial projecting length U remains which is significantly greater than the corresponding projecting length U in the case of the embodiment according to the disclosure.

In the case of the known solution of the references, it is moreover the case that the tolerance chain TK from the cage bushing to the movable element is very much longer than in the case of the embodiment according to the disclosure used for comparison. In this regard, reference is additionally made to FIG. 13.

In the known solution, only the force flow D for the damping force of the damping device runs via the rotary shaft 50, but not the force flow T for the preload force, which runs directly between the outer cage plate 28, or the intermediate disc (352) which can be attributed thereto, and the movable element 16. With regard to further details of the known solution, reference is made to the detailed description of the fourth exemplary embodiment therein as per FIGS. 15 to 17 and the explanations, which form the basis for this description, of the previous exemplary embodiments in DE 10 2014 225 036 A1/U.S. Pat. No. 9,463,846 B2.

It is clear from FIG. 16 that the embodiment according to the disclosure is axially considerably more compact than the known solution of the references. There is a considerable axial structural space advantage BV with regard to the "heel clearance". This is achieved through skilful arrangement of the various internal components, i.e. by a changed axial positioning of these components as compared to the known solution, specifically axially overlapping one another and/or inside the axial region of extent of the torsion spring, without significantly increasing the required radial structural space. Corresponding advantages also arise in the case of an embodiment of the rear derailleur with a different damping device, and also in the case of an embodiment of the rear derailleur without a damping device.

Figure 18:
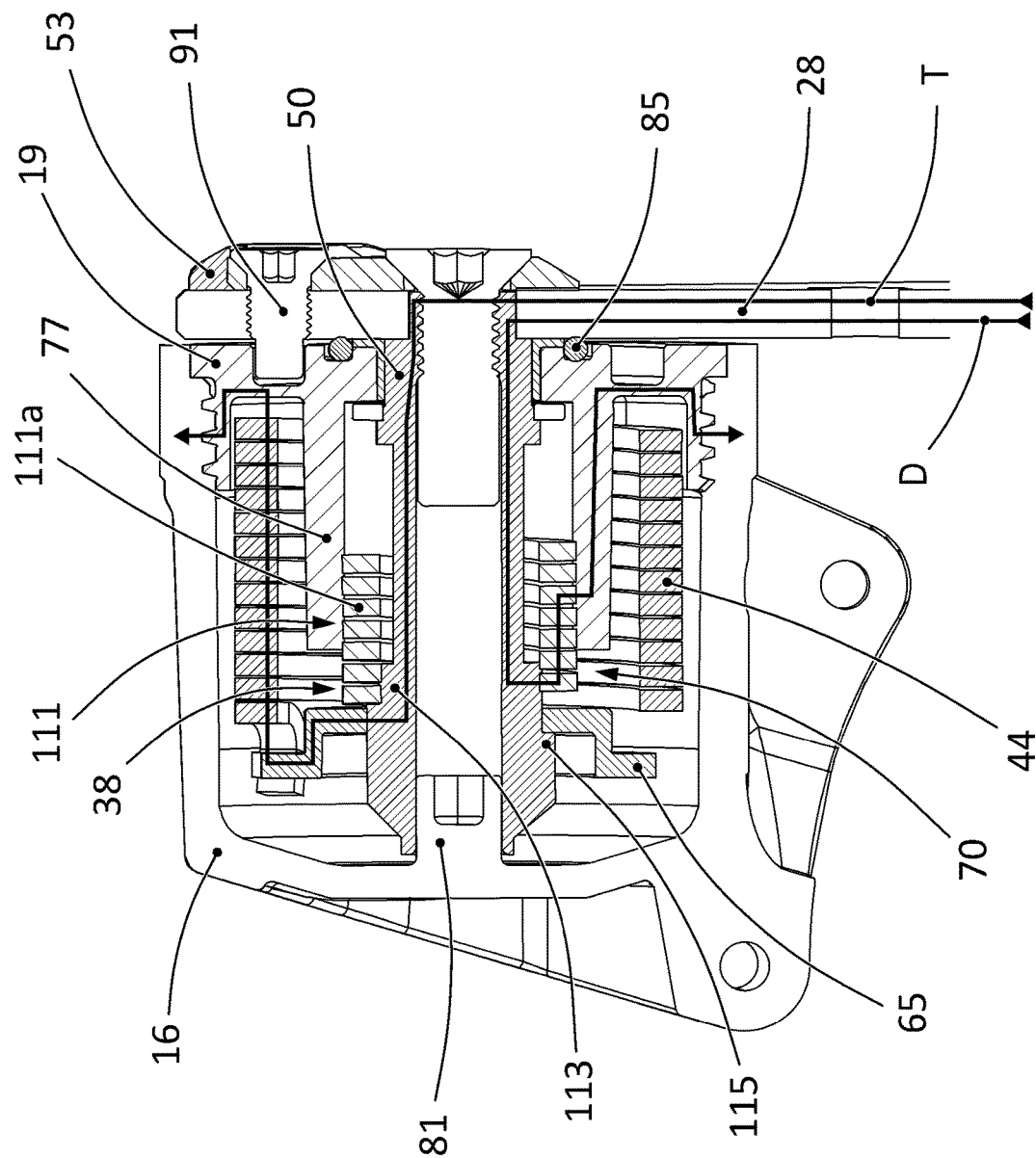
FIG. 18 shows a sectional view of a movable element (P knuckle) of a third exemplary embodiment in a radial section plane.

FIG. 18 shows a third exemplary embodiment for a bicycle derailleur of the disclosure according to a second design approach, which is considerably modified with regard to the embodiment of the damping device. Below, the same reference designations as in the preceding description of the first and second exemplary embodiments will be used for corresponding or analogous elements, and only the differences in relation to these exemplary embodiments will be discussed.

In the third exemplary embodiment, the damping device 38 is designed as a wrap spring clutch 111, the helical spring 111a, which can be referred to as wrap spring, of which is at one side held rotationally fixedly in the holder 77 of the housing cover 19 and, at the other side, at some of its spring windings, engages in frictionally locking fashion with a cylindrical shoulder 113 of the rotary shaft 50. Said wrap spring 111a simultaneously forms a friction device and a coupling device in the form of a freewheel clutch, because it generates different friction moments in a manner dependent on the direction of rotation of the rotary shaft 50 relative to the housing cover 19 and thus the movable element (P knuckle) 16. The winding direction of the wrap spring 111a is selected such that, in the case of a rotation of the rotary shaft 50 in the direction L counter to the tensioning direction S (cf. FIG. 2), the wrap spring contracts further owing to the acting friction forces, such that a significant damping force is exerted on the rotary shaft and thus on the chain guide assembly, which damping force counteracts an undesired loosening of the chain tension. By contrast, in the tensioning direction S, the frictionally locking engagement between the rotary shaft 50 and the wrap spring 111a loosens, such that only a very low or even negligible friction force, and thus no significant damping force, is exerted.

The wrap spring 111a which acts as damper spring may simply be pressed radially at the inside against the holder 77, designed for example as a sleeve portion, of the cover 19, or may alternatively be pressed radially at the outside onto a corresponding holder portion in order to be held preferably rotationally fixedly there, and, radially at the inside, is in frictionally locking operative engagement with a surface portion of the rotary shaft 50, as discussed. Alternatively, it is also conceivable for a wrap spring, which acts as damper spring and which has an opposite winding direction to the winding direction of the wrap spring 111a, to be coupled preferably rotationally conjointly radially at the inside to a portion of the rotary shaft, where the wrap spring is in frictionally locking operative engagement radially at the outside, at least some or all of its spring windings, with an inner circumferential portion of a sleeve portion or the like of the cover 19.

In the case of the implementation, proposed here, of the damping device 38 as a wrap spring, the coupling member 65 performs no function in relation to the friction device 70 or damping device 38. The coupling member 65 serves only for the coupling of the helical torsion spring 44 to the rotary shaft 50, for which purpose the coupling member 65 is arranged rotationally conjointly on the rotary shaft and is also held in an axially defined manner thereon by a shoulder 115 on the outer circumference. Otherwise, the third exemplary embodiment has many similarities with the first exemplary embodiment, as can be seen from a comparison with FIG. 3.

The advantages discussed on the basis of FIGS. 16, 17 and 13 in relation to the known solutions according to DE 10 2014 225 036 A1/U.S. Pat. No. 9,463,846 B2 are attained for all three exemplary embodiments illustrated.

The above-described exemplary embodiments of FIGS. 1 to 17 use friction discs and a roller-type freewheel, similarly to the situation in the document DE 10 2014 225 036 A1 or U.S. Pat. No. 9,463,846 B2, but in so doing overcome major disadvantages of known solutions, in particular with regard to dimensions, tolerance chains, freedom from play, leak-tightness, robustness, operational reliability and assembly and maintenance. The third exemplary embodiment makes it clear that corresponding advantages are attainable even with a damping device of completely different type, and corresponding advantages can be attained even in the case of embodiments without any damping device. The result is a significantly improved rear derailleur, and thus a significantly improved derailleur system, and altogether an improved bicycle.

According to the statements above, the present disclosure relates inter alia to a fundamentally novel construction of a spring-damper system in the P knuckle (movable element) 16 of a gearshift mechanism, which makes possible a range of improvements with regard to the problem scenarios presented above. Below, several of the proposed design solutions, and the advantages attained therewith, will be presented once again in a summarizing manner, without restricting the general nature, in particular on the basis of the second exemplary embodiment of FIGS. 10 to 17 and the known solution, shown in FIGS. 16a and 17, according to DE 10 2014 225 036 A1 (hereinafter also referred to for short as DE'036)/U.S. Pat. No. 9,463,846 B2 (hereinafter also referred to for short as US'846).

The integration of the spring-damper system to form a functional and independently preassemblable subassembly, cf. FIGS. 10 to 12 and FIGS. 8 and 9 relating to the first exemplary embodiment, is proposed. By contrast to the references cited in the introduction, in particular according to DE'036/US'846, it is the case in the gearshift mechanism or spring-damper system according to the disclosure that the spring moment and the damper moment are transmitted to the gearshift mechanism cage via the axle (rotary shaft).

By contrast, in the references, it has hitherto commonly been the case that only the damper moment has been transmitted via the axle, whereas the spring moment has been transmitted separately via the P washer (cover disc between outer cage and spring housing) or directly from the spring end to the gearshift mechanism cage. It is also the case, by contrast to the references, that the moment support of spring and damper on the P knuckle takes place via a common interface on the now multifunctional housing cover. In the references, it has hitherto been the case that separate support of the spring moment on the P knuckle (movable element) via a moulded element for the spring end, and of the damper moment on a hexagonal insert for the roller-type freewheel, has been implemented.

The force transfers from the cage axle to the spring housing/P knuckle in the case of a preferred embodiment of the disclosure will be described below. The force flows can be seen inter alia in FIGS. 12, 13 and 16. Force flow of the damper moment:

1. axle (rotary shaft) 50→friction disc 99 (via positive-locking elements of corresponding shape on axle and friction disc);
2. friction disc 99→running bushing 61 (friction moment between friction disc 99 and friction flange 63 of the running bushing 61);
3. running bushing 61→roller-type freewheel 60 (direction decoupling of the damper moment);
4. roller-type freewheel 60→housing cover 19 (by frictional locking of the rotationally fixed interference fit of the roller-type freewheel 60 in the housing cover 19); and
5. housing cover 19→P knuckle 16 (by frictional locking between housing cover 19 and P knuckle 16, or by corresponding moulded elements such as for example bayonet fastener of the housing cover in the P knuckle. The embodiment illustrated in the figures has, at this location, a multi-start thread with correspondingly large thread pitch.

Force Flow of the Spring Moment:

1. axle (rotary shaft) 50→spring flange (coupling member) 65 (via positive-locking elements of corresponding shape on axle 50 and spring flange 65);
2. spring flange 65→right-hand spring end 44b (via moulded element or cutout for the mounting of the spring end 44b on the spring flange 65, cf. FIGS. 10 and 12);
3. left-hand spring end 44a→housing cover 19 (via moulded element or cutout for the mounting of the spring end 44a on the housing cover 19, cf. FIGS. 10, 13 and 14); and
4. housing cover 19→P knuckle 16 (identically to the situation above with regard to the damper force flow under point 5).

The accordingly attained modified force flow leads inter alia to the effect that the left-hand spring end of the first elastic force store device 44 is supported in a static manner on the P knuckle, and the right-hand spring end acts with a driving action on the rotary shaft (axle) and thus on the gearshift mechanism cage. This is a reversal in relation to the references, in the case of which the right-hand spring end is supported in a static manner on the P knuckle, and the left-hand spring end acts on the gearshift mechanism cage, cf. FIG. 16. This difference leads, in the embodiment according to the disclosure, to a helical torsion spring 44 with left-handed winding, whereas said helical torsion spring has a right-handed winding in the case of the references.

The proposed construction according to the disclosure makes possible a particularly compact structural form of the spring-damper unit, and thus of the movable element (P knuckle). The modified force flows, the redesign and changed relative arrangement of major components and assemblies and the integration thereof as a spring-damper unit makes possible a significantly improved bearing arrangement with a maximal support width, cf. FIG. 16. This in turn makes possible a reduction in the width of the bearing points, and thus a further space saving.

The embodiment of the right-hand bearing as a bearing journal 81 in the P knuckle furthermore permits an axial overlap of bearing and preload nut (setting element) 76 and spring flange 65, that is to say the coupling member 65 which connects the torsion spring to the rotary shaft, whereby structural space is additionally saved in particular in a lateral direction. Furthermore, the preload nut can be made considerably narrower, because the abutment thereof against the rotationally secured spring flange requires no additional screw securing means or caulking as in the references, cf. FIG. 16, because the preload nut 76 which serves as setting element can be tightened against the spring flange 65. Such a screw securing means may however also be expedient in the context of the design of this embodiment according to the disclosure for the purposes of preventing or impeding unauthorized manipulation by a user. The structural width of the preload nut may furthermore also be reduced because, owing to the considerably enlarged diameter of the friction disc 99, a lower preload force of the preload spring 80 (which in the present exemplary embodiment is designed for example as a disc spring assembly 80) of the friction device 70 is sufficient.

The larger diameter of the friction disc 99 of the second exemplary embodiment or of the friction flange of the coupling member 65 of the first exemplary embodiment, on the one hand, and correspondingly of the friction flange 63 of the damper running bushing 61, on the other hand, also ensures an increased friction surface area of the friction device and, in association with this, a lower contact pressure and thus less wear, and likewise improved reproducibility or stabilization of the desired friction moment over the product service life. The larger friction disc diameter is in turn made possible by the integrated construction according to the disclosure of the spring-damper assembly, which furthermore does not require the cylinder element (cf. FIGS. 16a and 17) that is required in the references for the purposes of spring guidance and sealing.

The left-hand end of the running bushing 61 (cf. FIGS. 10, 13, 14 and 16) is preferably formed with an oblique stop surface and with a stop surface correlating therewith on the axle (rotary shaft) 50. In this way, for the same preload force, the friction moment of this friction pairing is increased, which additively contributes to the friction moment of the friction pairing between friction disc or friction flange and running bushing. Furthermore, this oblique stop surface or friction surface has a centring action, which has a positive effect on the axle guidance and the service life of the roller-type freewheel.

Further advantages of the embodiments according to the disclosure: On the basis of the disclosure proposals, the P knuckle assembly can be formed in the manner of a closed and completely sealed machine housing, which is extended through only at one point, at the housing cover 19, by the cage axle (rotary shaft) 50. By contrast to this, in the case of the references, at least the torsion spring is unsealed, cf. the top of FIG. 16, and can in fact also not be expediently sealed off with respect to the surroundings owing to the large radial diameter of the spring moment force flow. In the case of the references, this leads to corrosion problems and undesired changes in the resetting moments.

By contrast, owing to the proposals presented herein, for the completely sealed enclosure of all components of the spring-damper assembly, including the torsion spring, only one slipping seal is required, which can furthermore be arranged in a particularly effective manner on the very small axle diameter, whereby friction force, friction travel and wear of the seal can be considerably reduced in relation to the references.

The sealing of the bore in the housing cover for the left-hand spring end (cf. FIGS. 10, 13 and 14) can be realized by a static sealing element, for example by a sealing cap 103. Alternatively, it is also possible to implement a blind bore or blind cutout for the spring end in the housing cover 19. The housing cover 19 can likewise be easily sealed in a conventional manner with respect to the movable element (P knuckle) 16 which serves as housing, for example by an O-ring. In the embodiment illustrated in the figures with a thread (preferably a multi-start thread with a pitch of preferably 2-8 mm), effective sealing between housing cover 19 and housing (P knuckle) 16 arises already owing to the resulting axial contact pressure.

A feature of the arrangement proposed herein in the assembled state is that the cage spring provides a tightening moment for the screw connection between housing cover and P knuckle; in other words, the thread of the housing cover 19 seeks to tighten in the P knuckle 16. Thus, the release of the housing cover thread is prevented in an effective manner, and permanent sealing of the housing cover by the axial stop surface (cf. FIG. 13) thereof is ensured without additional sealing elements. Furthermore, the axial abutment of the housing cover 19 against the P knuckle 16 contributes to a short tolerance chain, which advantageously benefits the desired high positioning accuracy of the guide roller 32 in the gearshift mechanism cage. In this regard, reference is made to the illustration of the tolerance chains by black block arrows, the lengths of which add up to give the respective tolerance chain, in FIG. 13 and FIG. 16.

The outer diameter of the housing cover 19 is centred by a fit with the inner diameter on the P knuckle 16, cf. in particular FIG. 13. This also leads, together with the maximal support width of the axle mounting (cf. FIG. 16) already discussed, to excellent centring and thus concentricity and stiffness of the axle (rotary shaft) relative to the housing or P knuckle.

In order to be able to unscrew the spring-damper subassembly from the movable element (P knuckle) 16 without the use of tools, the gearshift mechanism cage is, in the embodiments illustrated (in addition to the "cage stop" which limits the cage movement during operation, that is to say the end stop of the cage counter to the spring force), also provided with a cage stop in the opposite direction of rotation, that is to say in the direction of the spring force, cf. FIGS. 14 and 15. Here, it is advantageously possible for one and the same rotational stop 103 on the housing cover 19 to serve as an abutment both for the end stop 89b and for the cage stop 89a. The left-hand end 44a of the helical torsion spring 44 or the sealing cap 103 for the left-hand spring end, or a correspondingly projecting moulded element on the housing cover 19, is preferably used as a rotational stop 103 in this context.

According to the above, a bicycle derailleur is provided which has a base element 12 which can be mounted on a bicycle frame, a movable element 16 which has a receptacle 17 and which is movably coupled to the base element 12, a rotary shaft 50 which is mounted in the movable element 16 in the receptacle so as to be rotatable about an axis of rotation A, and a chain guide assembly 25 which is rotatable relative to the movable element about the axis of rotation A and which is coupled rotationally conjointly to the rotary shaft 50. An elastic force store device 44 is configured to exert on the chain guide assembly a preload force which preloads said chain guide assembly in a defined direction of rotation relative to the movable element 16.

According to a first aspect, it is proposed that a damping device 38 which acts directly or indirectly between the movable element 16 and the chain guide assembly has a coupling device 60 which is arranged radially within the first elastic force store device 44 within the axial region of extent thereof and by which the damping device is coupled to at least one of a support, which is static in relation to the movable element, and the rotary shaft 50.

According to a second aspect, it is proposed that the first elastic force store device 44 is coupled via the rotary shaft 50 to the chain guide assembly 25 in order to exert the preload force on the chain guide assembly via the rotary shaft.

According to a third aspect, it is proposed that the rotary shaft 50 is rotatably mounted by a rotary bearing arrangement on a cover element 19 which, together with the rotary shaft 50 extending through a passage opening of the cover element, closes the receptacle 17 of the movable element 16 and is fastened to the movable element 16.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rear bicycle derailleur, comprising:
   a base element mounted on a bicycle frame;
   a movable element having a receptacle, the movable element being movably coupled to the base element;
   a rotary shaft mounted in the receptacle of the movable element so as to be rotatable about an axis of rotation;
   a chain guide assembly rotatable relative to the movable element about the axis of rotation and is coupled rotationally conjointly to the rotary shaft;
   a first elastic force store device configured to exert on the chain guide assembly a preload force which preloads the chain guide assembly in a first direction of rotation relative to the movable element; and
   a damping device configured to, via the rotary shaft, exert a damping force on the chain guide assembly and support the damping force on a support which is static in relation to the movable element,
   wherein the damping device includes a coupling device by which the damping device is coupled to at least one of the support and the rotary shaft,
   the coupling device is arranged radially within the first elastic force store device and entirely within the axial extent of the first elastic force store device.

2. The rear bicycle derailleur of claim 1, wherein the coupling device is a friction device which generates the damping force by engaging in a frictionally locking fashion with at least one of the rotary shaft and the support.

3. The rear bicycle derailleur of claim 1, wherein the coupling device is a freewheel clutch configured to exert the damping force on the chain guide assembly via the rotary shaft.

4. The rear bicycle derailleur of claim 3, wherein the first elastic force store device is coupled via the rotary shaft to the chain guide assembly in order to exert the preload force on the chain guide assembly via the rotary shaft.

5. The rear bicycle derailleur of claim 4, wherein the rotary shaft is rotatably mounted by a rotary bearing arrangement on a cover element which, together with the rotary shaft extending through a passage opening of the cover element, closes the receptacle of the movable element and is fastened to the movable element.

6. A rear bicycle derailleur, comprising:
   a base element mounted on a bicycle frame;
   a movable element having a receptacle, the moveable element being movably coupled to the base element;
   a rotary shaft is mounted in the receptacle of the movable element so as to be rotatable about an axis of rotation;

a chain guide assembly is rotatable relative to the movable element about the axis of rotation and is coupled rotationally conjointly to the rotary shaft; and a first elastic force store device is configured to exert on the chain guide assembly a preload force which preloads the chain guide assembly in a first direction of rotation relative to the movable element, wherein the first elastic force store device is coupled via an inner end region of the rotary shaft to the chain guide assembly in order to exert the preload force on the chain guide assembly via the rotary shaft.

7. The rear bicycle derailleur of claim 6, wherein a damping device is configured to, via the rotary shaft, exert a damping force on the chain guide assembly and support the damping force, on a support which is static in relation to the movable element, and the damping device includes a coupling device by which the damping device is coupled to at least one of the support and the rotary shaft.

8. The rear bicycle derailleur of claim 7, wherein the rotary shaft and the damping device are integrated into a structural unit which is received in the receptacle of the movable element and which is fastened to the movable element.

9. The rear bicycle derailleur of claim 8, wherein the structural unit has a cover element which is axially closely adjacent to the chain guide assembly and which, together with the rotary shaft extending through a passage opening of the cover element, closes the receptacle and is fastened to the movable element.

10. The rear bicycle derailleur of claim 9, wherein the first elastic force store device is also integrated into the structural unit.

11. The rear bicycle derailleur of claim 10, wherein the cover element has a holder for the freewheel clutch of the damping device, by which holder, an opposing force in relation to the damping force exerted on the chain guide assembly via the rotary shaft is supported on the cover element.

12. The rear bicycle derailleur of claim 11, wherein the rotary shaft is rotatably mounted on the movable element by a first rotary bearing arrangement provided at a region of the moveable element that is delimiting the receptacle in an axial direction and averted from the chain guide assembly, delimiting the receptacle in an axial direction and averted from the chain guide assembly, of the movable element, wherein the first rotary bearing arrangement comprises a bearing journal, which projects into the receptacle, and a bearing bushing, which receives the bearing journal, and wherein the rotary shaft is rotatably mounted on the bearing journal by the bearing bushing.

13. The rear bicycle derailleur of claim 12, wherein the rotary shaft is rotatably mounted on the cover element, which closes the receptacle, by a second rotary bearing arrangement which is provided in the region of the passage opening or closely adjacent thereto.

14. The rear bicycle derailleur of claim 13, wherein the first elastic force store device is coupled in positively locking fashion at a first coupling region to the cover element and is coupled in positively locking fashion at a second coupling region to a coupling member, which projects radially from the rotary shaft and is arranged rotationally conjointly on the rotary shaft, in order to exert the preload force via the coupling member on the rotary shaft and thus on the chain guide assembly.

15. The rear bicycle derailleur of claim 14, wherein friction surfaces, coupled to the rotary shaft, of the damping device are preloaded against one another by a second elastic force store device, and first and second axial pressure forces exerted by the second elastic force store device in opposite axial directions are both supported on the rotary shaft, producing a closed force flow.

16. The rear bicycle derailleur of claim 15, wherein a setting element at an internal thread is in threaded engagement with an external thread at an end region of the rotary shaft spaced apart from the chain guide assembly, which serves for the setting of an axial preload force of the second elastic force store device.

17. The rear bicycle derailleur of claim 16, wherein the setting element defines an axial stop for the coupling member and which participates in exerting the preload force of the first elastic force store device on the chain guide assembly via the rotary shaft.

18. The rear bicycle derailleur of claim 16, wherein a support arrangement supports a first axial pressure force exerted by the second elastic force store device on the rotary shaft, and has friction surfaces including the coupling member, and which participates in exerting the preload force of the first elastic force store device on the chain guide assembly via the rotary shaft.

19. A rear bicycle derailleur comprising:
a base element mounted on a bicycle frame;
a movable element having a receptacle and is movably coupled to the base element;
a rotary shaft mounted in the receptacle of the movable element so as to be rotatable about an axis of rotation;
a chain guide assembly which is rotatable relative to the movable element about the axis of rotation and which is coupled rotationally conjointly to the rotary shaft; and
a first elastic force store device configured to exert on the chain guide assembly a preload force which preloads the chain guide assembly in a first direction of rotation relative to the movable element,
wherein the rotary shaft is rotatably mounted by a rotary bearing arrangement on a cover element which closes the receptacle of the movable element and is fastened to the movable element, the rotary shaft extending through a passage opening of the cover element.

20. The rear bicycle derailleur of claim 19, wherein the rotary shaft is rotatably mounted on the movable element by a further rotary bearing arrangement provided at a region of the moveable element that is delimiting the receptacle in an axial direction and averted from the chain guide assembly which is provided at a region, delimiting the receptacle in an axial direction and averted from the chain guide assembly, of the movable element, wherein the further rotary bearing arrangement includes a bearing journal, which projects into the receptacle, and a bearing bushing, which receives the bearing journal, and wherein the rotary shaft is rotatably mounted on the bearing journal by the bearing bushing.

21. The rear bicycle derailleur of claim 20, wherein a damping device is configured to, via the rotary shaft, exert a damping force on the chain guide assembly and support the damping force, on a support which is static in relation to the movable element, and wherein the damping device comprises a coupling device by which the damping device is coupled to at least one of the support and the rotary shaft.

22. The rear bicycle derailleur of claim 21, wherein the first elastic force store device is coupled via the rotary shaft to the chain guide assembly in order to exert the preload force on the chain guide assembly via the rotary shaft.

* * * * *